US011925593B1

(12) United States Patent
Cimo

(10) Patent No.: US 11,925,593 B1
(45) Date of Patent: Mar. 12, 2024

(54) MUSCLE MEMORY TRAINING APPARATUS AND METHOD OF USE

(71) Applicant: Gaetano Cimo, Laguna Niquel, CA (US)

(72) Inventor: Gaetano Cimo, Laguna Niquel, CA (US)

(*) Notice: Subject to any disclaimer, the term of this patent is extended or adjusted under 35 U.S.C. 154(b) by 0 days.

(21) Appl. No.: 18/233,317

(22) Filed: Aug. 12, 2023

(51) Int. Cl.
*A61H 23/00* (2006.01)
*A61H 23/02* (2006.01)

(52) U.S. Cl.
CPC . *A61H 23/0263* (2013.01); *A61H 2023/0281* (2013.01); *A61H 2201/1652* (2013.01); *A61H 2203/0406* (2013.01)

(58) Field of Classification Search
CPC ........ A61H 23/0263; A61H 2023/0281; A61H 2201/1652; A61H 2203/0406
See application file for complete search history.

(56) References Cited

U.S. PATENT DOCUMENTS

| | | | | | |
|---|---|---|---|---|---|
| 3,951,260 | A * | 4/1976 | Frazee | A62B 99/00 116/210 |
| 4,809,896 | A * | 3/1989 | McColly | A45F 3/14 224/259 |
| 5,261,394 | A * | 11/1993 | Mulligan | A61H 23/0254 601/41 |
| 9,408,774 | B2 * | 8/2016 | Rafaeli | A63B 21/06 |
| 2012/0253247 | A1 * | 10/2012 | Aoki | A63B 21/4043 601/112 |
| 2014/0260714 | A1 * | 9/2014 | Vallery | G01C 19/04 74/5.37 |
| 2015/0018724 | A1 * | 1/2015 | Hsu | A61B 5/4023 600/595 |
| 2019/0133801 | A1 * | 5/2019 | Burnett | A61H 23/0245 |
| 2020/0323729 | A1 * | 10/2020 | Arazi | A61H 7/004 |
| 2023/0008214 | A1 * | 1/2023 | Northen | A61B 5/4836 |
| 2023/0301864 | A1 * | 9/2023 | Barwick | A61H 3/00 128/845 |

* cited by examiner

*Primary Examiner* — Timothy A Stanis
(74) *Attorney, Agent, or Firm* — Invention To Patent Services; Alex Hobson

(57) ABSTRACT

A muscle memory training apparatus restores muscle memories that have become aberrant to previous normal or superior performance. It restores reflex stabilization muscle memories thereby providing a stable platform upon which voluntary muscle memories are restored. It is based on the universally accepted fact that muscle memories may be improved with practice and the yet to be accepted fact that reflexes execute muscle memories that may likewise be improved. The apparatus generates movements, perturbations, that are applied to the user; thereby stimulating reflex sensory neurons, effectuating stabilization reflexes, executing reflex muscle memories, and contracting muscles that countervail the apparatus perturbations. The perturbations and thereby the execution of the muscle memories is repeated over a protracted period and practiced multiple times per second. Practice improves the performance of the stabilization reflexes thereby restoring stabilization. Practice of voluntary muscle memories restores performance because they are practiced upon a stable platform.

24 Claims, 19 Drawing Sheets

MUSCLE MEMORY TRAINING APPARATUS AND METHOD OF USE

BACKGROUND OF THE INVENTION

Field of the Invention

The invention relates to a muscle memory training apparatus that is configured to produce off balancing perturbations to require a person to correct for the perturbations to perform a function and methods of using to improve their neuromuscular system and muscle memory. The invention relates to systems, devices, and methods for mitigating movement disorders, and more specifically relates to restoration of muscle memories with practice.

Background

Drug Therapy

Drug treatment is the best-known therapy for mitigation of movement disorders. However, in addition to disastrous side effects and possible drug dependency issues, they can cause movement disorders. Levodopa and dopamine agonists are known to cause proprioception deficits and drug induced dyskinesia.

A drug taken to mitigate some symptoms is likely to exasperate other symptoms. Treatment for tremor may cause balance defects. In fact, drugs taken to mitigate movement disorders affect other organism regulatory systems. For example, the same drug used to suppress tremor is used to limit blood pressure. One cannot treat one without inadvertently treating the other. The unintended consequences are called side effects.

Devices

Some symptoms are mitigated with devices. Deep Brain Stimulation [DBS] requires a surgically implanted pacemaker type device. Experts are unclear how DBS works, but by sending high frequency electrical impulses into specific areas of the brain it can mitigate symptoms. Devices to mitigate tremor, a common movement disorder symptom, are dampened with shock absorbing devices that are attached to a subject's affected hand. One such method employs a gyroscope; others utilize viscous liquids, elastic materials, and magnetic fields. Such devices attenuate tremor as well as inadvertently dampening voluntary motion of the extremity they are attached to and have no lasting change. Tremor cancellation devices apply a countervailing force that cancels the tremor. Such devices include exoskeletons that are worn over the arm or hand. They are affixed with active mechanisms that sense tremor motion and produce countervailing forces. Such devices may be uncomfortable, expensive and suppress intentional motion. Tremor Isolation devices seek to isolate the tremor from a stabilized object. The subject grasps a platform that is loosely coupled to the object platform. As the object attempts to follow the tremor motion, its motion is sensed and converted to electrical output that drives actuators attached to the object platform with opposing forces thereby preventing the object from moving. Such systems do not attempt to suppress tremors but allow them to be insulated from an object. Buildings are isolated from earthquakes, weapon systems from vibrating platforms and products like Liftware, isolate a person's tremor from a utensil, spoon, scalpel, paint brush etc. Transcutaneous Electrical Nerve Stimulation (TENS) stimulation of selected afferent nerves may improve their performance leading to partial temporary tremor relief. Whole Body Vibration has been around for over 100 years when Jean-Marin Charcot prescribed sitting in a vibrating chair to treat tremor. Over the years, people have experienced various degrees of tremor suppression after being subjected to vibration from riding motorcycles, operation of power tools, riding in horse and buggy carriages and numerous other means of being subjected to low frequency vibration.

Rehabilitation Therapy

People automatically rehabilitate by adapting compensatory measures. For example, irregular posture and movement is assumed to avoid falling. People crouch or lean forward, outstretch hands, position feet apart, and avoid unnecessary movement to keep their center of gravity low and over a large base of support. They deploy defensive movements like moving slowly, avoiding sharp turns, and walking backwards. They shuffle their feet while walking so that both feet are always in contact with the floor. Freezing reduces the risk of falling.

Other measures include behavioral changes like avoidance of difficult motor tasks and movements, standing, walking, or threading a needle. Use of assistive devices like walkers, crutches, wheelchairs, and care givers, are common ways of coping.

Perhaps the most devastating compensatory measure is the diversion of cognitive resources to control movement normally handled by reflexes. Movement is slow, staccato, deliberate, and carefully planned as muscle contractions are consciously rather than automatically controlled. When the brain becomes preoccupied micromanaging functions normally delegated, cognitive demands must wait. That is why people with movement disorders appear to not being able to walk and talk at the same time.

Use it or Lose it

Drugs, assistive devices, and most rehabilitation therapies use exogenous means to provide symptom relief that may be counter-productive to endogenous processes. For example, using a walker to assist walking reduces demand on neurons and muscles causing them to atrophy.

Most movement disorder symptoms are compensatory measures. Whether adapted automatically or as a prescribed rehabilitation, such adaptations can become new norms. Paradoxically, the more effective the rehabilitation, the more permanent the new norm. Compensatory measures: assistive devices, medications, and behaviors, may provide effective symptom relief, but they may be counter-productive to endogenous processes. For example, muscles atrophy, motor skills deteriorate, and muscle memories fade when not used. Use it or lose it.

Restoration Therapy

Restoration therapies center on training rather than compensating for movement disorders. Balance and movement exercises like standing on one foot or a balance board, performing difficult maneuvers like Tai Chi, dancing, and physical therapy, and executing fine motor skills like playing the piano, threading a needle, or placing pegs in a pegboard seek to restore or elevate movement performance. Acrobats, athletes, dancers, surgeons, musicians demonstrate how movement can be improved well beyond normal, and people with movement disorders can restore normal movement. Restoration therapies can improve movement to normal or superior levels. And restoration has only positive side effects.

SUMMARY OF THE INVENTION

Drugs, assistive devices, and rehabilitation therapies are interventions that interfere with or modulate biological systems and processes. They may be the only recourse for some people with movement disorders. However, biological systems are plastic. They adapt to environmental conditions, can be trained, and thereby restored. That is the natural way they are designed to be restored. The invention is restoration therapy.

Stabilization System

Reflexes are closed loop mechanisms that sense, respond to, and countervail unintentional movement. There are many manmade examples of such systems. For example, Battleship guns are mounted on stabilized platforms that isolate them from the movement of the ship. Whereas the ship may pitch, roll, yaw, and move in response to wind and shifting weights, the platform does not. Sensors detect the ship movement and actuators attached to the platform produce forces that countervail the ship movement.

In this manner, aiming the gun is greatly simplified as it is mounted on a stable rather than a moving platform. Similar technology is used with buildings that are stabilized against earthquakes and active suspension systems that stabilize an automobile against variations in road surface and reflexes that stabilize balance and joints against unintended movement.

Biological Stabilization Systems

Reflexes sense and execute muscle memories that countervail unintentional movement. When stabilization systems fail to do their job, or worse yet, cause rather than mitigate perturbations, intended movement is impaired. Aberrant reflex muscle memories cause voluntary muscle memories to become aberrant because they attempt to adapt to an unstable platform. Motor skills are extremely difficult to maintain when stabilization systems become deficit. A person with tremor, rigidity, imbalance, or inability to automatically sense and respond to unintended movement may practice a motor skill and never achieve adequate performance. It is virtually impossible to develop or maintain motor skills on an unstable platform.

Voluntary Muscle Memory

Muscle memory is generally described as a voluntary movement that is essentially automatic and requires little or no cognitive intervention. Practicing movement with intent to improve and knowledge of performance increases accuracy, efficiency, and automaticity.

Reflex Muscle Memory

Reflex muscle memory can be improved the same way. But how do you cause a reflex to be effectuated? Unlike voluntary muscle memories that respond to conscious decision, reflex muscle memories respond to stimulus of sensory neurons. The apparatus stimulates sensory neurons the way they are designed to be stimulated. It delivers perturbations to stabilization reflexes. It stretches muscles effectuating stretch reflexes, perturbs balance effectuating balance reflexes and does so under varying load conditions that effectuate Golgi tendon organ reflexes. The perturbations and thereby the execution of the muscle memories is repeated over a protracted period and practiced multiple times per second. Practice improves the performance of the stabilization reflexes thereby restoring stabilization.

A System of Movements

Whether voluntary, reflexive, or imposed by external forces, movement causes multiple stabilization reflexes to be effectuated. For example, walking is voluntary, intentional movement, the execution of multiple voluntary muscle memories, that continuously change the center of gravity, the size and position of the base of support, and their relationship to each other, thereby perturbing balance and effectuating balance reflexes. Limbs are repositioned and that effectuates stretch reflexes. Shifting weight causes muscle tension reflexes. Walking would be countervailed, opposed, by reflexes, but for the system's ability to distinguish between forces caused by voluntary movement which are not to be countervailed and forces caused by perturbations to stabilization which are to be countervailed. Walking movements are not countervailed whilst the perturbations to stabilization caused by walking are.

In another example, a reflex causes movement that effectuates other reflexes. A person steps on a tack causing a withdrawal reflex, that contracts muscles lifting the foot to prevent further injury. That movement causes a shift in the body's center of gravity and a substantial shift in position and size of the base of support. But for other reflexes, the person would fall.

It is the deficit system that must be restored and that is why it is the system that is practiced.

Practice Makes Perfect

When perturbation is combined with voluntary movements like those of daily living activity or prescribed movements like exercises or practicing fine motor skills like threading a needle or engaging in cognitive activity like carrying on a conversion, the entire movement system may be practiced.

Practice Reflex Muscle Memories to Restore Stabilization and Practice Voluntary Muscle Memories Upon a Stabilized Platform to Restore them.

The invention is directed to a muscle memory training apparatus that is configured to produce a force by the movement of weights within a housing. The muscle memory training apparatus is configured to be coupled to a person to cause an offsetting force or perturbations, requiring the person to accommodate for this force while performing activities and therefore strengthens their neuromuscular plasticity system and training muscle memory. The housing of the muscle memory training apparatus may include a motor that moves a weight to produce a vibratory offsetting force. The housing may be coupled to a coupling plate that may be an angle adjustment plate having an interconnect portion that enables the housing to be coupled thereto in a number of different orientations to produce offsetting forces in different directions, such as forward and backward, and from side to side. Also, the muscle memory training apparatus may have a controller that enables a person to change the frequency and/or amplitude of the offsetting forces, such as by changing the rotational speed or revolutions per minute (RPM) of the axle or a reciprocating speed of a weight moving back and forth. Also, the weight and corresponding offsetting force may be changed by movement of a weight with respect to an arm that the weight is coupled to, or by changing the weight from a first weight to second weight. As used herein, the rotational speed is the revolutions per minute of the axle of the motor.

In addition, the direction of rotation of the axle may be changed to change the direction of perturbation, such as toward or away from a person, to the left or right, for example. A switch may be configured on the perturbation portion or housing to enable a person to change the direction of rotation. Also, a function may be configured to randomize the direction of rotation, wherein a controller may switch the rotational direction from a first rotational direction to a second rotational direction The invention is directed to a muscle memory training apparatus that is configured to produce a force by the movement of weight within a housing. The muscle memory training apparatus is configured to be coupled to a person to cause an offsetting force or perturbations, requiring the person to accommodate for this force while performing activities and therefore strengthens their neuromuscular plasticity system and training muscle memory. The housing of the muscle memory training apparatus may include a motor that moves a weight to produce a vibratory offsetting force. The housing may be coupled to a coupling plate that may be an angle adjustment plate having an interconnect portion that enables the housing to be coupled thereto in a number of different orientations to produce offsetting forces in different directions, such as forward and backward, and from side to side. Also, the muscle memory training apparatus may have a controller that enables a person to change the frequency and/or amplitude of the offsetting forces, such as by changing the rotational speed or revolutions per minute (RPM) of the axle or a reciprocating speed of a weight moving back and forth. Also, the weight and corresponding offsetting force may be changed by movement of a weight with respect to an arm that the weight is coupled to, or by changing the weight from a first weight to second weight. A change in weight may be a substantial change in weight amount, wherein a second weight is at least 20% different from a first weight. A first arm may have a first weight and a second arm may have a second weight that is substantially different in weight than the first weight, being at least 20% different than the second weight. As used herein, the rotational speed is the revolutions per minute of the axle of the motor.

In addition, the direction of rotation of the axle may be changed to change the direction of perturbation, such as toward or away from a person, to the left or right, for example. A switch may be configured on the perturbation portion or housing to enable a person to change the direction of rotation. Also, a function may be configured to randomize the direction of rotation, wherein a controller may switch the rotational direction from a first rotational direction to a second rotational direction.

The invention provides a muscle memory training apparatus particularly configured to strengthen muscle memory and may act to suppress tremors by improving performance of stretch reflexes that maintain muscle tone. The neuromuscular mechanisms of stretch reflexes are subjected to forced motion that heightens demands on them thereby training muscle memory and evoking neuromuscular plasticity; the retention of neuromuscular changes made to meet the heightened demands.

Neuroplasticity reorganizes the structure of the human organism to accommodate external demand. Repeated or heightened demand improves performance that is to be retained or remembered. This amazing capability is ubiquitous. It is occurring in all human organisms all the time. Neuroplasticity is the modification of the nervous system by making individual neurons larger and faster, activating dormant neurons or enlisting the services of neighboring neurons. Pathways may be changed, take detours around defective cells or create new or enlist additional pathways. In addition, neuroplasticity retains or remembers the modifications.

Muscle cells are also plastic. They become larger and new cells are created when stimulated repeatedly such as through repetitive exercise. They remain that way if stimulation continues, but as exercise is reduced or ceases, muscles reduce in size and speed. As used herein, neuromuscular plasticity is the restructuring of the nerves and the muscles used in reflex circuits that are important for maintaining muscle tone and balance. Muscle memory is a commonly used term that describes how practicing a given motion that involves multiple neuromuscular circuits are trained, improved and remembered. That is how a person perfects a golf swing. Practicing the correct swing over and over again creates muscle memory. Likewise, the brain experiences plasticity when a person repeats a phone number over and over again so it will be remembered.

The scientific community has long acknowledged the phenomenon Long Term Potentiation (LTP). Long Term Potentiation is a known form of synaptic plasticity. When nerve cells are subjected to stimulation, Long Term Potentiation is able to modify them and increase their performance. The modification persists for a protracted period, up to several weeks, following removal of the stimulation.

In these examples and many more, the modification and enhanced performance is remembered but tends to be forgotten if not used. However, when use is resumed, restoration takes less effort than was initially required to create the plasticity. It is believed that tremor is the result of poor muscle tone brought about by poorly responding stretch reflexes and that muscle tone can be greatly improved through training. Unlike man made machines, the human body can repair itself and improve strength, coordination and fluidity through training. But how does one train stretch reflex circuits.

Tremor that has a low amplitude and hardly noticeable is normal. Tremor that is excessive, readily seen and disabling is often referred to as involuntary tremor. Opposing stretch reflex circuits hold limbs in target positions and attempt to do so with minimum tremor. When disturbed by external forces, a stretch reflex that moves the limb in one direction is offset by an opposing stretch reflex that moves the limb in the opposite direction. The stretch reflexes do not occur at the same time, but alternate causing the limb to oscillate about the target position.

The muscle memory training apparatus as described herein causes a heightened demand upon the stretch reflexes which may be a synchronized motion that emulates tremor. This exercises the sensory neurons; muscle spindles that respond to sudden changes in muscle length and all its effectors; all the neurons and muscles it effects.

Balance is maintained in a similar manner using most of the same circuits used for tremor. The difference primarily being the type of sensory neurons used. The vestibular system senses linear and rotational movements of the head. Stimulation evokes reflexes that contract the muscles to offset the imbalances.

The muscle memory training apparatus exercises the sensory neurons of tremor and balance reflexes. The muscle memory training apparatus may be coupled to a person, such as by being strapped to the torso, such as to their back. The muscle memory training apparatus may be configured to produce an offsetting force or perturbation, that causes the person to engage their muscles and their neuromuscular plasticity system to maintain their balance and also overcome the perturbation to perform activities. Muscle memory is strengthened using the muscle memory training apparatus.

An exemplary muscle memory training apparatus is configured to be donned on a person, such as being strapped or otherwise coupled to a person's torso, such as to their back or to their chest. The muscle memory training apparatus is configured to produce an offsetting force or perturbation that forces the person to be off balance, thereby requiring them to engage their neuromuscular plasticity system to maintain balance or perform various movements. The person may wear the muscle memory training apparatus while they stand and try to perform a task, such as outlining a shape as described further herein, or any number of other tasks. The muscle memory training apparatus may be donned while walking or performing task such as sweeping or vacuuming or swinging a golf club or bat, or other functions. The offsetting force will require that the person engage the neuromuscular plasticity system to effectively perform the task and thereby improve muscle memory.

An exemplary muscle memory training apparatus may include a perturbation portion that is configured in a housing and includes a motor that moves a weight or weights to produce an offsetting force. The weights may be coupled to arms that reciprocate or rotate. The perturbation portion may have a first weight arm and a second weight arm and these arms may extend from the motor in opposing directions but along a common rotational axis. The arms may be coupled to the axle of the motor by an arm axle coupler that enables rotational adjustment of the arm with respect to the axle. The weight may be coupled to the arm by an arm weight coupler that may allow some adjustment of the weight along the arm or from the arm. This adjustment may change the centrifugal force by changing a torque offset distance, the distance from the rotational axis of the axle to the center of mass of the arm weight. If the arm weight is positioned further from the rotational axis of the axle, it will produce more torque on the perturbation portion and more of a perturbing force on the person. Exchanging the weight to another weight of different mass will also change the centrifugal force. The arm weight arm, an extension from the arm weight may have different lengths or may be slidably adjustable with respect to the weight or the arm extending from the axle. A first arm weight coupler may be used to adjust the length of the arm weight arm and then lock in the desired length. These adjustments may be used to change the offsetting force.

An exemplary housing may be configured to detachably attach to a coupling plate and the coupling plate may have a coupling pad that is configured between the coupling plate and the person when donned by the person, for comfort. The coupling plate may have an interconnect portion to enable detachable attachment of the housing to the coupling plate. Also, the coupling plate may be an angle adjustment plate having an interconnect portion that enables attachment of the housing in a plurality of angles with respect to the plate. The interconnect portion may comprise recesses or apertures configured in geometric pattern to enable the housing interconnect portion or angle adjustable protrusion to be inserted therein in a plurality of angular positions with respect to the coupling plate.

The housing may comprise two or more angle adjustable protrusions extending from faces or sides of the housing to enable the weights to be oriented in various positions with respect to a person. For example, a first angle adjustable protrusion may be coupled to the coupling plate to produce a forward and backward (sagittal axis) offsetting force. The housing may then be coupled to the coupling plate by a second angle adjustable protrusion, such as one that extends orthogonally from the housing from the first angle adjustable protrusion to produce a side to side (frontal axis) offsetting force. Alternating the orientation of the housing may be done to further strengthen the neuromuscular plasticity system. Also, for a given activity, a person may choose an offsetting force in one axis versus another.

Therapy

The programmable apparatus delivers repetitive, passive perturbations to stabilization reflex sensory neurons. It stretches muscles effectuating stretch reflexes, perturbs balance effectuating balance reflexes and does so under varying load conditions that effectuate Golgi tendon organ reflexes.

The therapy combines the passive movement with voluntary movement; exercise routines, that direct or target the passive perturbations and heighten demands on all movement muscle memories. Therapy is performing motor and cognitive tasks with intent to improve whilst stabilization reflexes are perturbed.

The apparatus is wearable, hand-held, or attached with a user interface. It provides multi-directional, adjustable perturbations to joint and balance reflexes and when coupled combined with daily living activity or prescribed movements targeted for optimum results. For example, the Romberg test is a series of postures designed to challenge and measure a person's balance skill. It can also be used as an exercise, and another means of heightening and targeting demand.

A weight is rotated imparting a continuous sequence of perturbations to stabilization reflexes and thereby execution of reflex muscle memories.

Perturbation parameters, frequency, force, and rotational direction are adjustable. The frequency may be automatically or manually set by adjusting the motor control duty cycle. The force may be set by changing the radius of the orbital path and/or the weight being rotated. Rotational direction is switch selectable and causes perturbations to occur in a reversed order causing reflexes to occur in reverse order. Targeting reflexes is facilitated by orienting the perturbations to the user posture. For example, reorient the perturbation unit from the vertical to horizontal plane or walk to change the center of gravity, base of support, joint positions and load.

The first arm and second arm may be configured to extend in the same direction from the axle or in opposing directions or even rotational offset directions. The direction of extension of the first and second arms, the weight amount on each arm and the direction of rotation may produce a twisting perpetuation or a wobble type force to offset the user.

A spinning weight or object will produce a moment of inertia. This moment of inertia produces a force when the axis of rotation is moved or rotated. Therefore, when a person puts on an exemplary muscle memory training apparatus and moves, such as by bending over at the waist or by turning to the left or right, a moment of inertia force will create an offsetting force on the moving person. This moment of inertia force may be increased when the rotational speed is increased, (RPMs), or when the arms extend in opposing directions from the axle.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
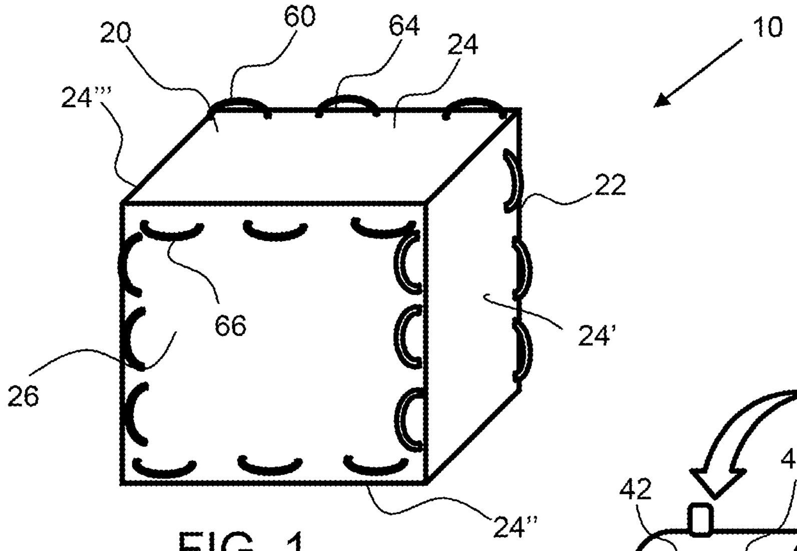
FIG. 1 shows an exemplary muscle memory training apparatus having a housing for the producing forces to off balance a person and a plurality retainers configured to retain a strap configured to extend from the muscle memory training apparatus to a person.

Corresponding reference characters indicate corresponding parts throughout the several views of the figures. The figures represent an illustration of some of the embodiments of the present invention and are not to be construed as limiting the scope of the invention in any manner. Some of the figures may not show all of the features and components of the invention for ease of illustration, but it is to be understood that where possible, features and components from one figure may be an included in the other figures. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of “a” or “an” are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations, and improvements of the described embodiments, will occur to those skilled in the art and all such alternate embodiments, combinations, modifications, improvements are within the scope of the present invention.

Figure 2:
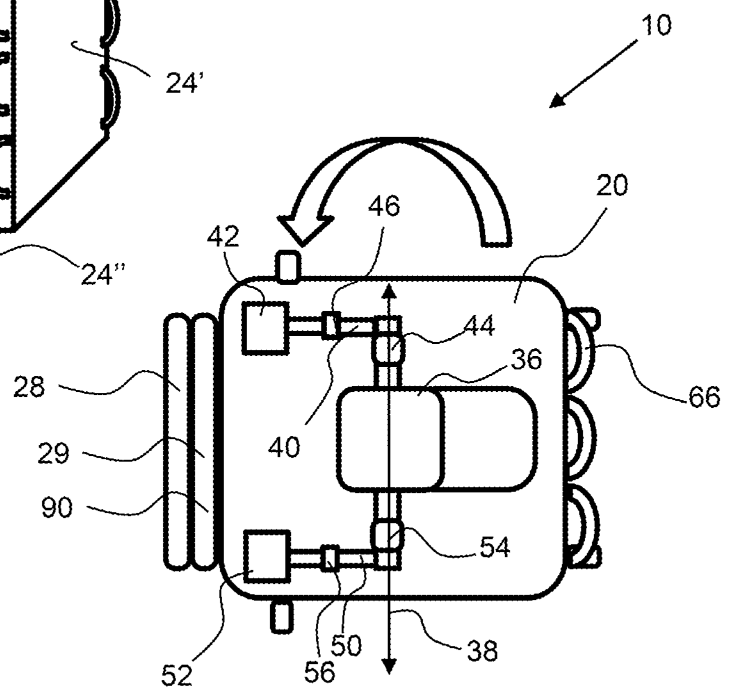
FIG. 2 shows a cross section of the exemplary muscle memory training apparatus having a motor with arms coupled to opposing sides of the motor and having weights coupled to the arms that produce an off-balance force.
Figure 3:
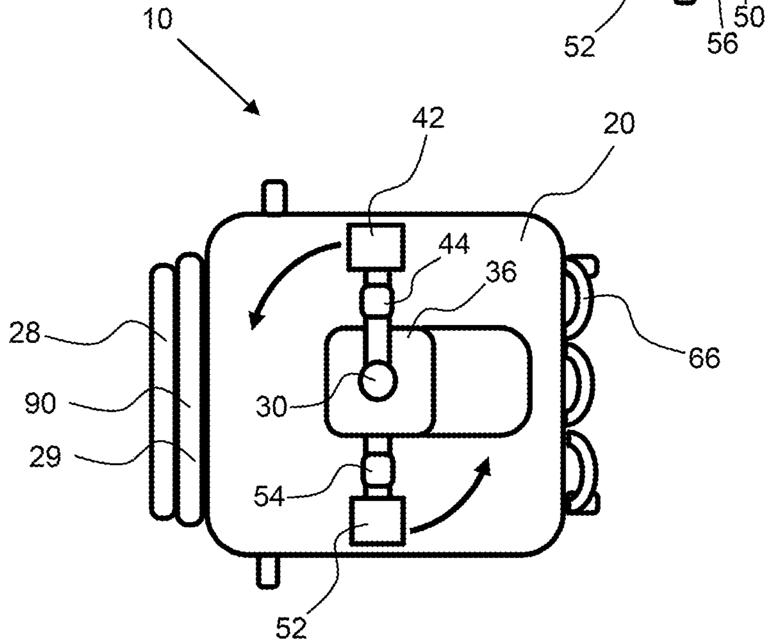
FIG. 3 shows a cross section of the exemplary muscle memory training apparatus shown in FIG. 2, now turned ninety degrees and the first arm and second arm are extending in opposing directions, 180 degrees apart, versus the same rotational orientation in FIG. 2.

Referring now to FIGS. 1 to 3, an exemplary muscle memory training apparatus 10 has a housing 20, which may be an enclosure, for the producing forces to off-balance a person and a plurality of retainers 60, configured to retain a strap that extends from the muscle memory training apparatus to a person. There are a back retainers 66 configured along the back face 26 of the housing 20 and side retainers 64 configured on each of the four side faces 24, 24' 24" and 24'''. Some side retainers are not visible in this view. The front face 22, opposite the back face 26 may have a coupling pad 28 for comfort.

Referring now to FIG. 2, the exemplary muscle memory training apparatus 10 has a motor 36 with a first arm 40 and a second arm 50 extending from the axle 30 and extending in the same direction from the axle. Both the first arm 40 and second arm 50 are configured to be rotationally adjusted about the axle by a respective first arm axle coupler 44 and a second arm axle coupler 54. As shown the arms are extending in the same rotational direction with respect to the axle 30. Each of the arms has a detachably attachable weight, the first arm has a first arm weight 42 attached to the first arm 40 by the first arm weight coupler 46 and the second arm 50 has a second arm weight 52 attached to the second arm 50 by the second arm weight coupler 56. The arms coupled to opposing sides of the motor and having weights coupled to the arms that produce an off-balance force. The muscle memory training apparatus 10 is configured to produce an off-balance force toward and away from the front face 22. On the front face 22 of the housing 20, a coupling plate 29 and coupling pad 28 may be configured. The coupling pad 28 may provide comfort and padding between the housing and a person’s back. A coupling plate 28, may be an angle adjustment plate 90 as described herein, enabling the housing to be rotated with respect to the angle adjustment plate 90. The straps, torso strap 70 and shoulder straps as shown in FIGS. 4 and 5 may be coupled with the coupling plate 29 or angle adjustment plate 90.

Referring now to FIG. 3, the exemplary muscle memory training apparatus 10 shown in FIG. 2, is now turned ninety degrees such and the first arm and second arm are now extending in opposing directions, 180 degrees apart, versus the same rotational orientation of the arms as shown in FIG. 2. This change in the orientation of the arms and the rotational orientation of the housing will produce different off-balancing forces. A person may don the muscle memory training apparatus 10 is a first orientation as shown in FIG. 2 and perform activities and then switch one of the arms and rotate the housing 20, 90 degrees and don the muscle memory training apparatus 10 as shown in FIG. 2 and perform activities to strengthen their neuromuscular plasticity system and strength muscle memory.

Figure 4:
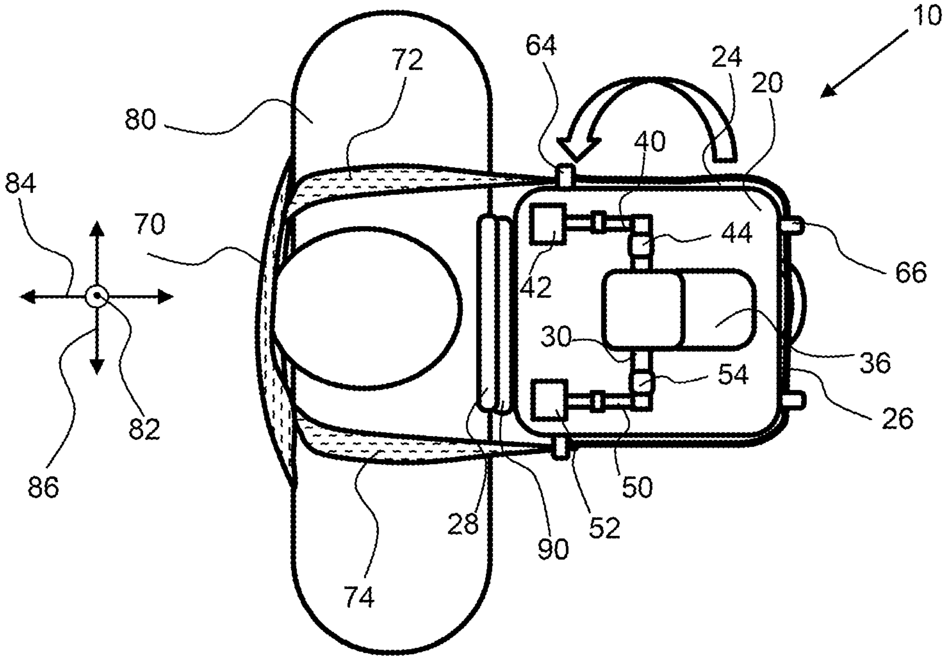
FIG. 4 shows a top view of a person with the exemplary muscle memory training apparatus strapped to their back and the arms spinning with the arm weights attached to produce an off-balancing force along a longitudinal axis (vertical with respect to the person standing) and sagittal axis (front to back).
Figure 5:
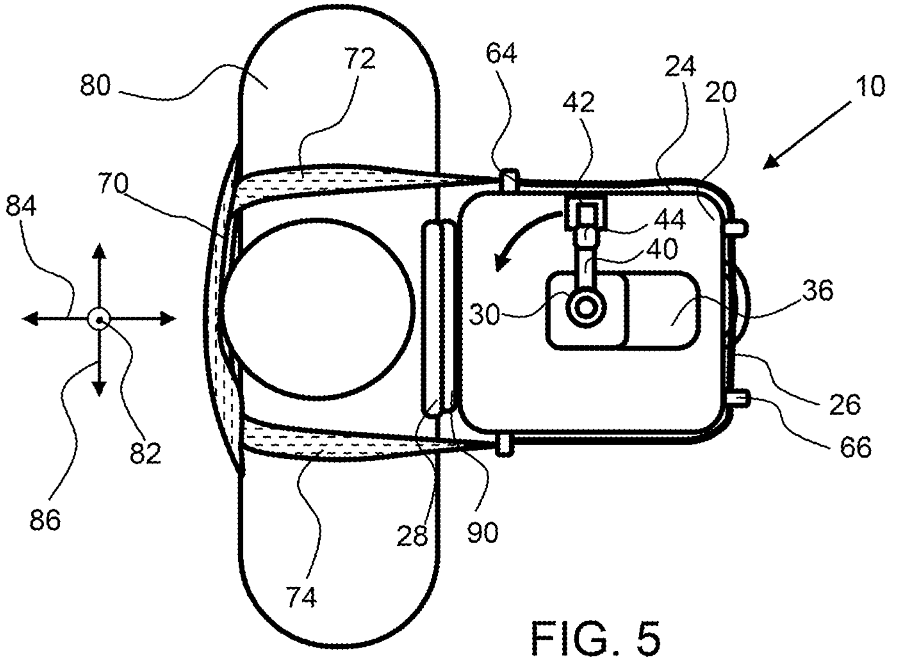
FIG. 5 shows a top view of a person with the exemplary muscle memory training apparatus strapped to their back as shown in FIG. 4, now with the muscle memory training apparatus rotated 90 degrees with the arm spinning in a frontal axis (side to side).
Figure 6:
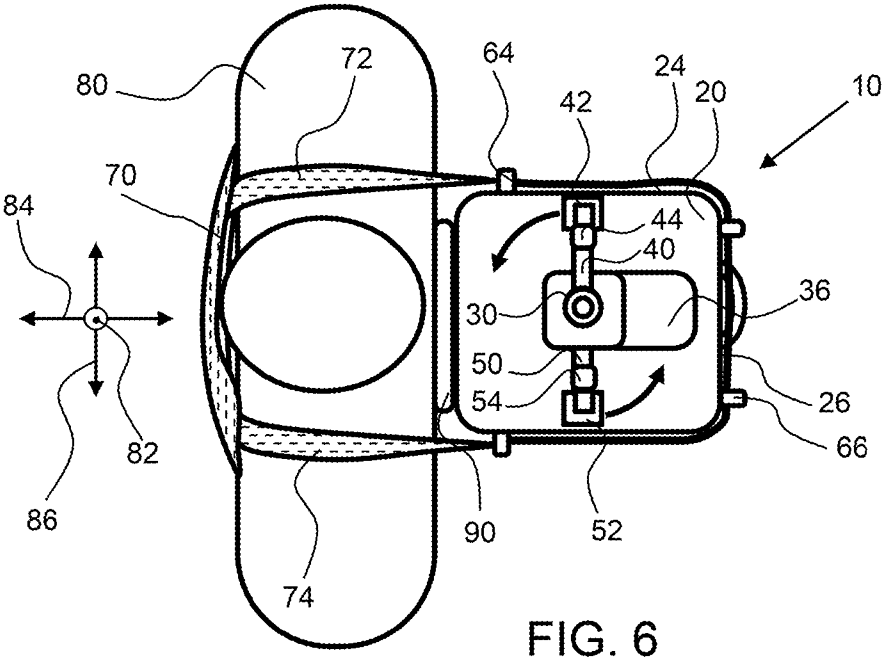
FIG. 6 shows a top view of a person with the exemplary muscle memory training apparatus strapped to their back as shown in FIG. 5, now with the first arm and second arm extending in opposing directions from the axle, wherein the first arm extends 180 degrees from the second arm from the axle.

Referring now to FIGS. 4 to 6, a person 80 has the exemplary muscle memory training apparatus 10 strapped to their back by the first shoulder strap 72, the second shoulder strap 74 and the torso strap 70, that extends around the persons chest or waist, for example. The straps extend through side retainer 64 on opposing sides of the housing 20 and around the back side 26 of the housing 20 through a pair of back retainers 66 to effectively restrain the housing to the person’s back with the coupling pad 28, configured therebetween. The motor 36 is rotating the first arm 40 and second arm 50 with the respective first arm weight 42 and second arm weight 52 attached thereto to produce an off-balancing force along a longitudinal axis 82 (vertical with respect to the person standing) and sagittal axis 84 (front to back with respect to the person standing) in FIG. 4 and along a frontal axis 86 (side to side with respect to the person standing) in FIG. 5. The orientation of the muscle memory training apparatus 10 in FIG. 4 is like that shown in FIG. 2 and the orientation in FIG. 5 is like that shown in FIG. 3.

The perturbation portion 21 has been rotated 90 degrees about the sagittal axis 84 from FIG. 4 to FIG. 5. In FIG. 4, the axle 30 extends in the frontal axis 86 or generally horizontally with the person standing erect on a horizontal surface with the exemplary muscle memory training apparatus 10. In FIG. 5, the axle 30 extends vertically or along the longitudinal axis 82. As described herein, the perturbation portion 21 may be configured to rotation with respect to angle adjustment plate 90.

As shown in FIG. 6, the exemplary muscle memory training apparatus 10 is strapped to the back of a person 80 (user) as shown in FIG. 5, now with the first arm and second arm extending in opposing directions from the axle, wherein the first arm extends 180 degrees from the second arm from the axle. This configuration may produce a twisting force with one weight pushing forward while the opposing weight on the second arm producing a pulling force, or force away from the user.

Referring now to FIGS. 7 to 13, a person has an exemplary muscle memory training apparatus 10 strapped to their back to produce an off-balancing force that they must accommodate for while they attempt to perform a task, such as tracing a circle or figure eight with their outstretched arm. As shown in each of FIGS. 7 to 13, the muscle memory training apparatus is secured to the person by a first shoulder strap 72 and a second shoulder strap 74 and a torso strap 70. The straps extend through a side retainer 64 on a side 24 of the housing 20 and a pair of back retainers 66 on a back 26 of the housing 20.

Figure 7:
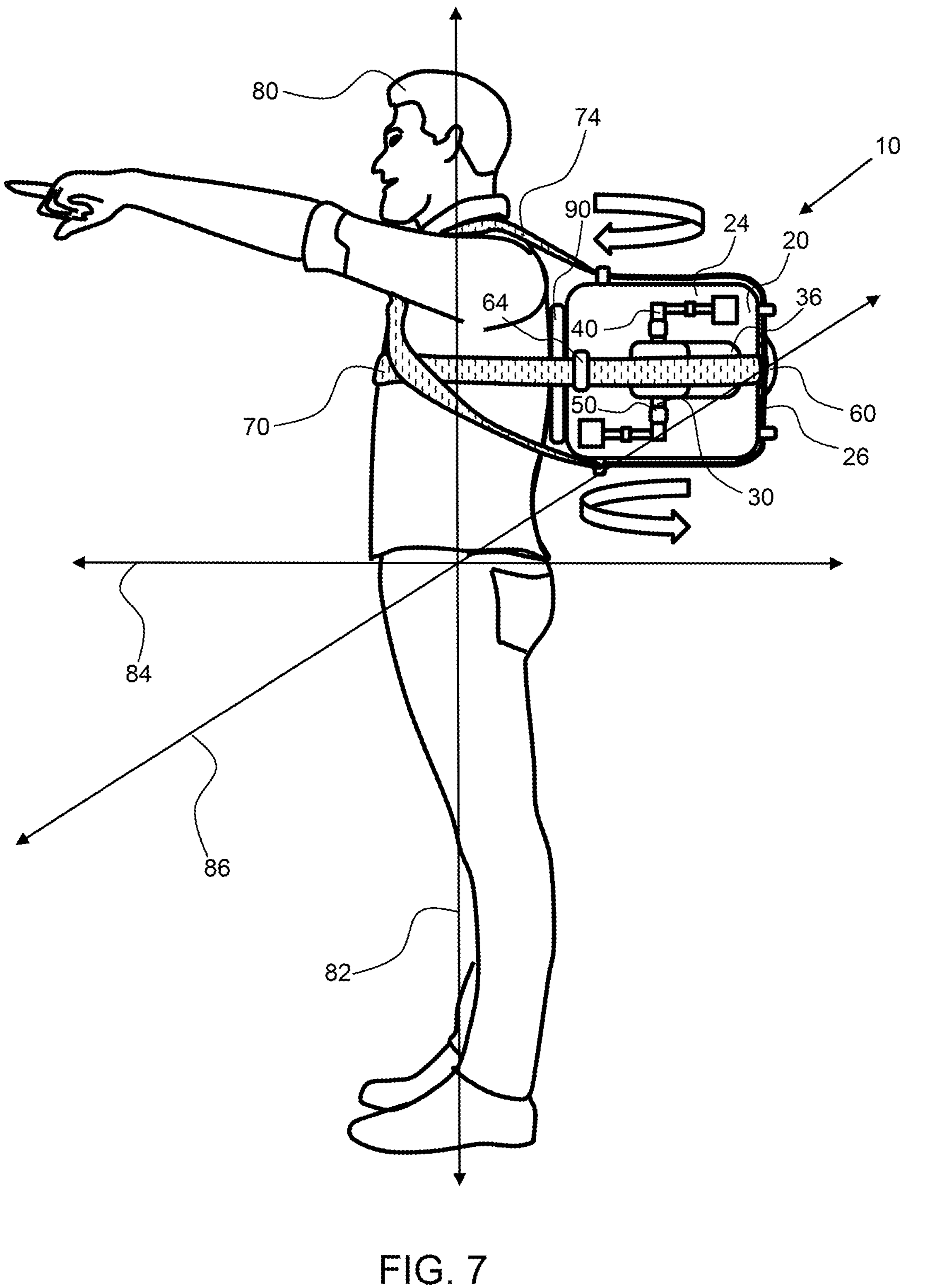
FIG. 7 shows a side view of a person with the exemplary muscle memory training apparatus strapped to their back and the arms spinning with the arm weights attached to produce an off-balancing force along a frontal axis (side to side), as shown in FIG. 6.

As shown in FIG. 7, the axle 30 of the motor 36 extends vertically or along the longitudinal axis 82 with the person standing upright on a horizontal surface. The first arm 40 and second arm 50 are configured 180 offset from each other with respect to the axle 30. The motor spins the two weights to produce an off-balancing force in the sagittal axis 84 (front to back).

Figure 8:
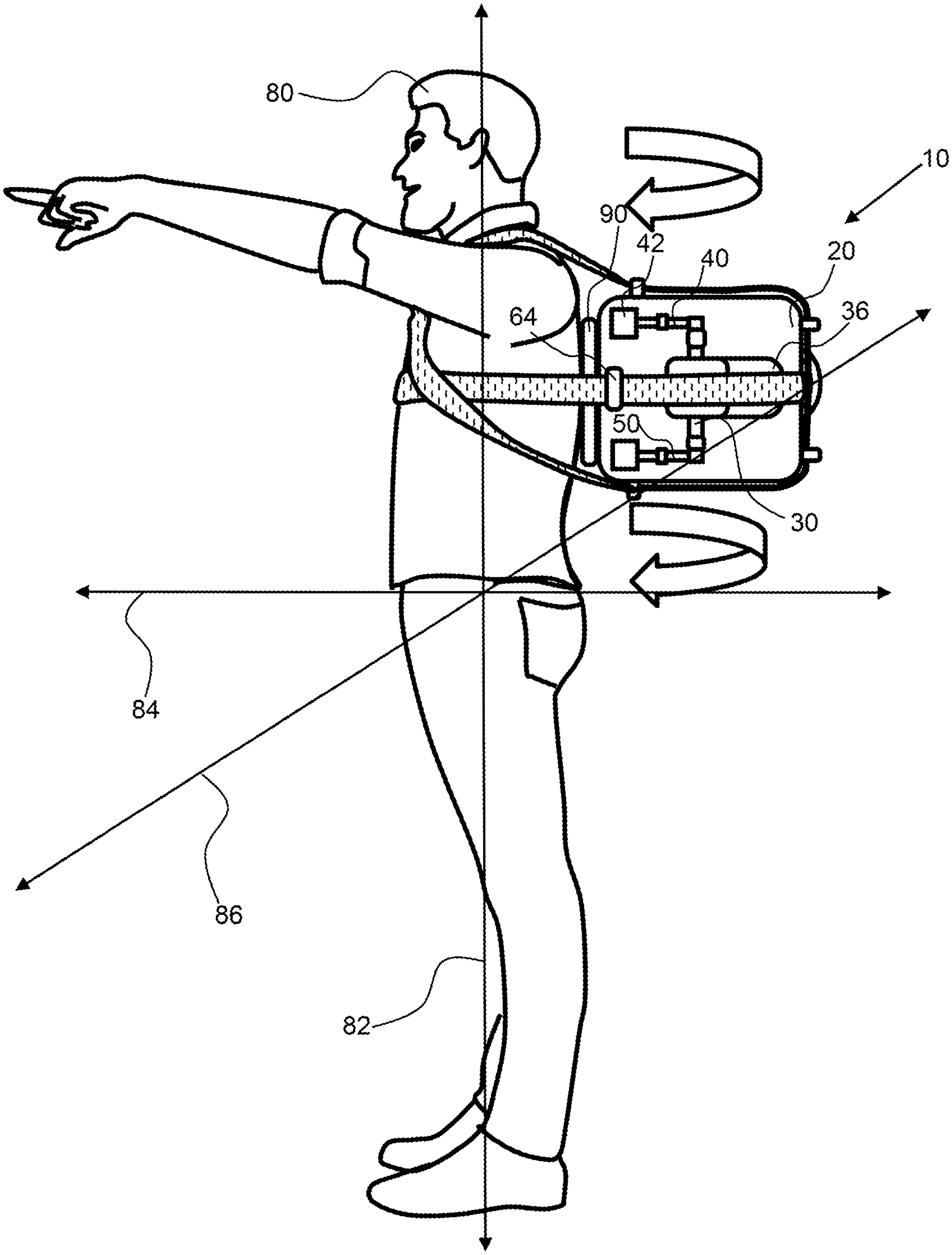
FIG. 8 shows a side view of a person with the exemplary muscle memory training apparatus strapped to their back as shown in FIG. 7, with the arms now extending in the same direction from the axle to produce a stronger off balancing force.

As shown in FIG. 8, the axle 30 of the motor 36 extends vertically or along the longitudinal axis 82 with the person standing upright on a horizontal surface. The first arm 40 and second arm 50 extend radially from the axle in alignment with each other. The motor spins the two weights to produce an off-balancing force in the sagittal axis 84 (front to back). This configuration may produce a stronger off-balance force as the weights are aligned with each other.

Figure 9:
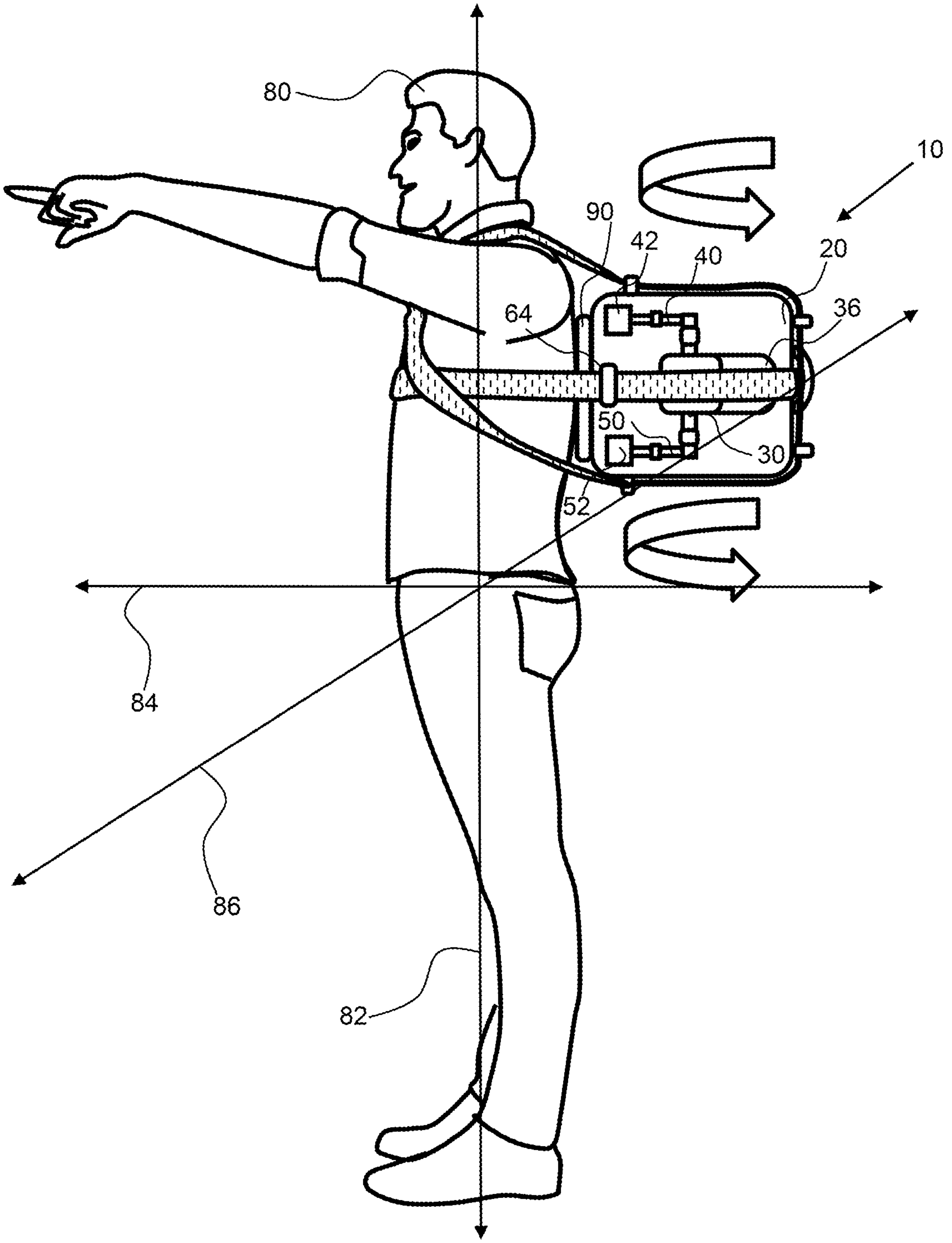
FIG. 9 shows a side view of a person with the exemplary muscle memory training apparatus strapped to their back as shown in FIG. 8, with the arms now rotating in an opposite direction from the direction shown in FIG. 8.

As shown in FIG. 9, the axle 30 of the motor 36 extends vertically or along the longitudinal axis 82 with the person standing upright on a horizontal surface. The first arm 40 and second arm 50 extend radially from the axle in alignment with each other. The motor spins the two weights to produce an off-balancing force in the sagittal axis 84 (front to back). This configuration shows that the direction of rotation of the motor may be reversed, wherein the rotation direction in FIG. 9 is opposite the direction of rotation shown in FIG. 8.

Figure 10:
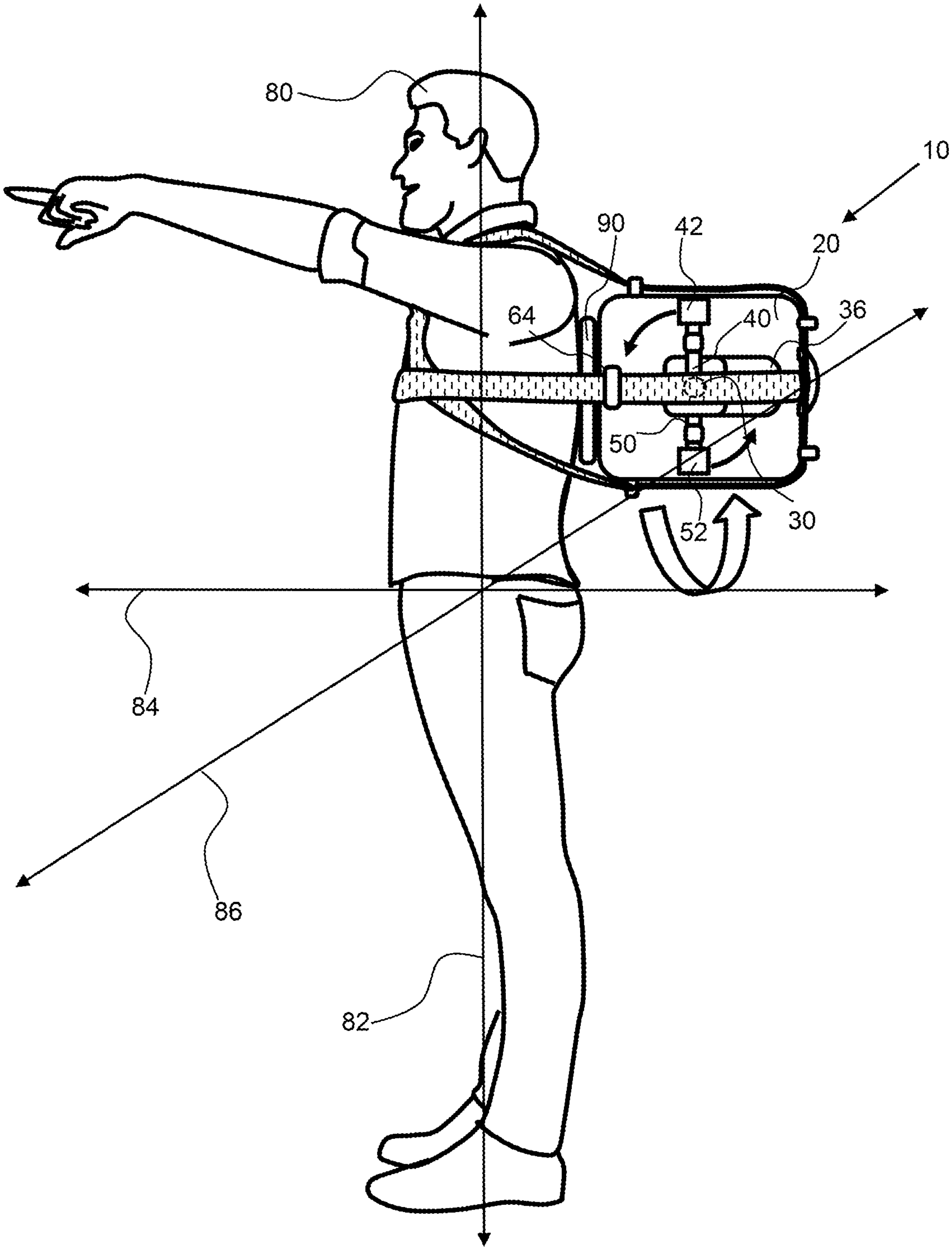
FIG. 10 shows a side view of a person with the exemplary muscle memory training apparatus strapped to their back as shown in FIG. 2, with the arms now extending in opposing directions from the axle.

As shown in FIG. 10, the axle 30 of the motor 36 extends horizontally or along the sagittal axis 84 with the person standing upright on a horizontal surface. The first arm 40 and second arm 50 extend radially from the axle 30 in opposing directions of offset 180 degrees. The motor spins the first arm weight 42 and second arm weight 52 to produce an off-balancing force in the sagittal axis 84 (front to back) to produce both an off-balancing force in the sagittal axis 84 and longitudinal axis 82.

Figure 11:
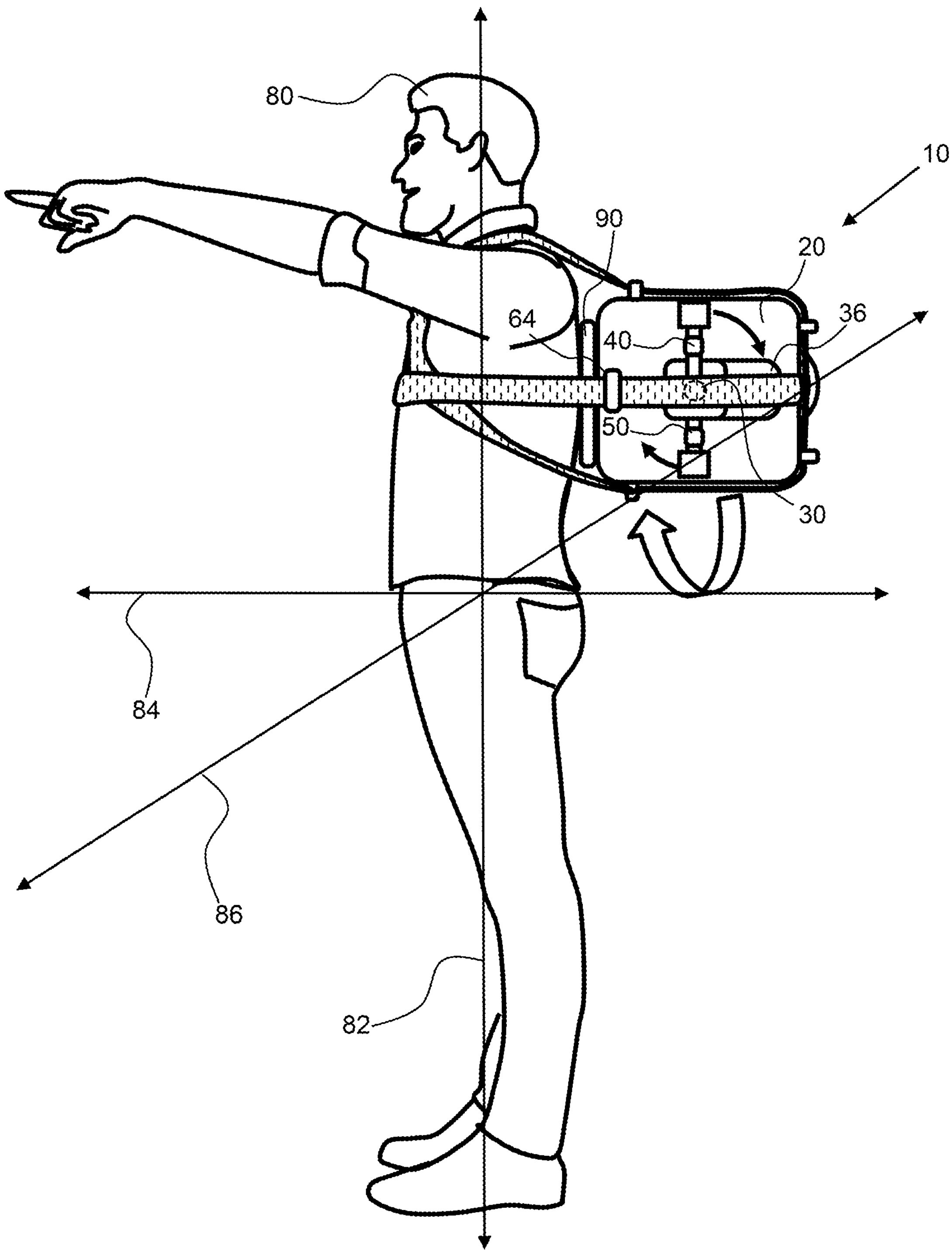
FIG. 11 shows a side view of a person with the exemplary muscle memory training apparatus strapped to their back as shown in FIG. 10, with the arms now rotating in an opposite direction from the direction shown in FIG. 10.

As shown in FIG. 11, the motor 36 spins the first arm weight 42 and second arm weight 52 in an opposite direction from that shown in FIG. 10, to produce an off-balancing force in the sagittal axis 84 (front to back) to produce both an off-balancing force in the sagittal axis 84 and longitudinal axis 82.

Figure 12:
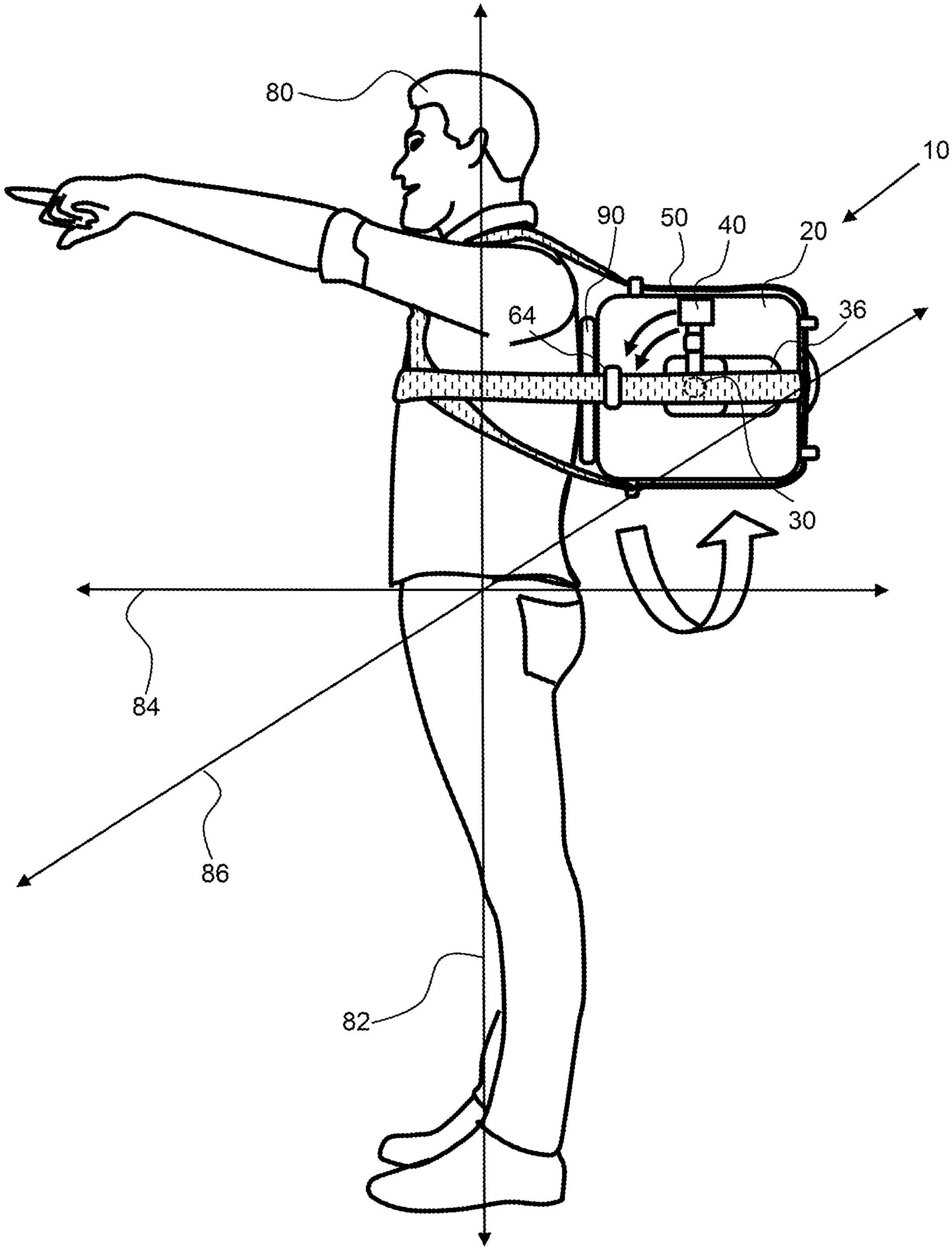
FIG. 12 shows a side view of a person with the exemplary muscle memory training apparatus strapped to their back as shown in FIG. 10, with the arms now extending in the same directions from the axle.

As shown in FIG. 12, the axle 30 of the motor 36 extends horizontally or along the sagittal axis 84 with the person standing upright on a horizontal surface. The first arm 40 and second arm 50 extend radially from the axle 30 in the same direction, or in radially alignment from the axle. The weights therefore spin in unison together about the axle to produce both an off-balancing force in the sagittal axis 84 and longitudinal axis 82. This configuration may produce a stronger off-balance force as the weights are aligned with each other.

Figure 13:
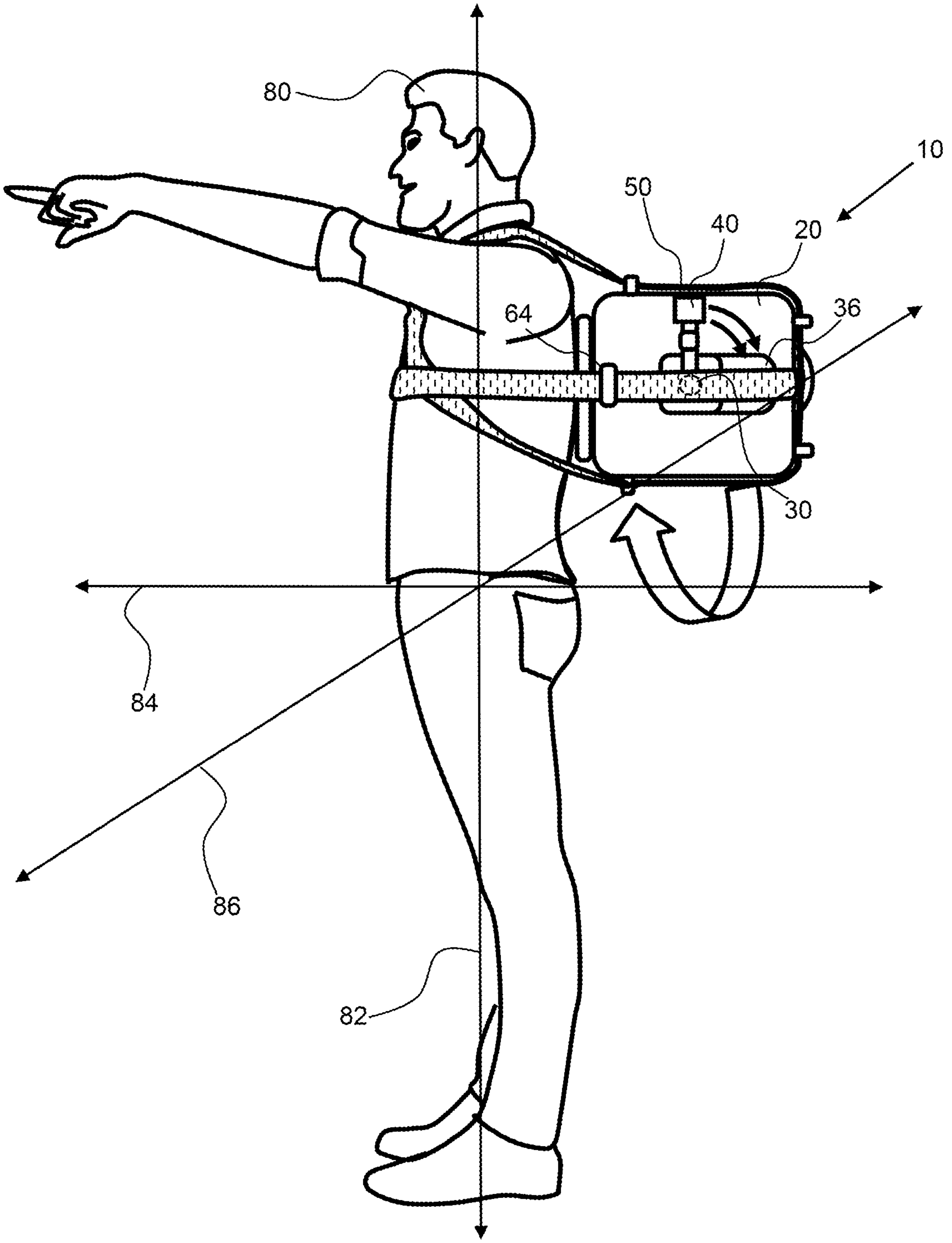
FIG. 13 shows a side view of a person with the exemplary muscle memory training apparatus strapped to their back as shown in FIG. 12, with the arms now rotating in an opposite direction from the direction shown in FIG. 12.

As shown in FIG. 13, the motor 36 spins the first arm weight 42 and second arm weight 52 in an opposite direction from that shown in FIG. 1, to produce both an off-balancing force in the sagittal axis 84 and longitudinal axis 82.

Figure 14:
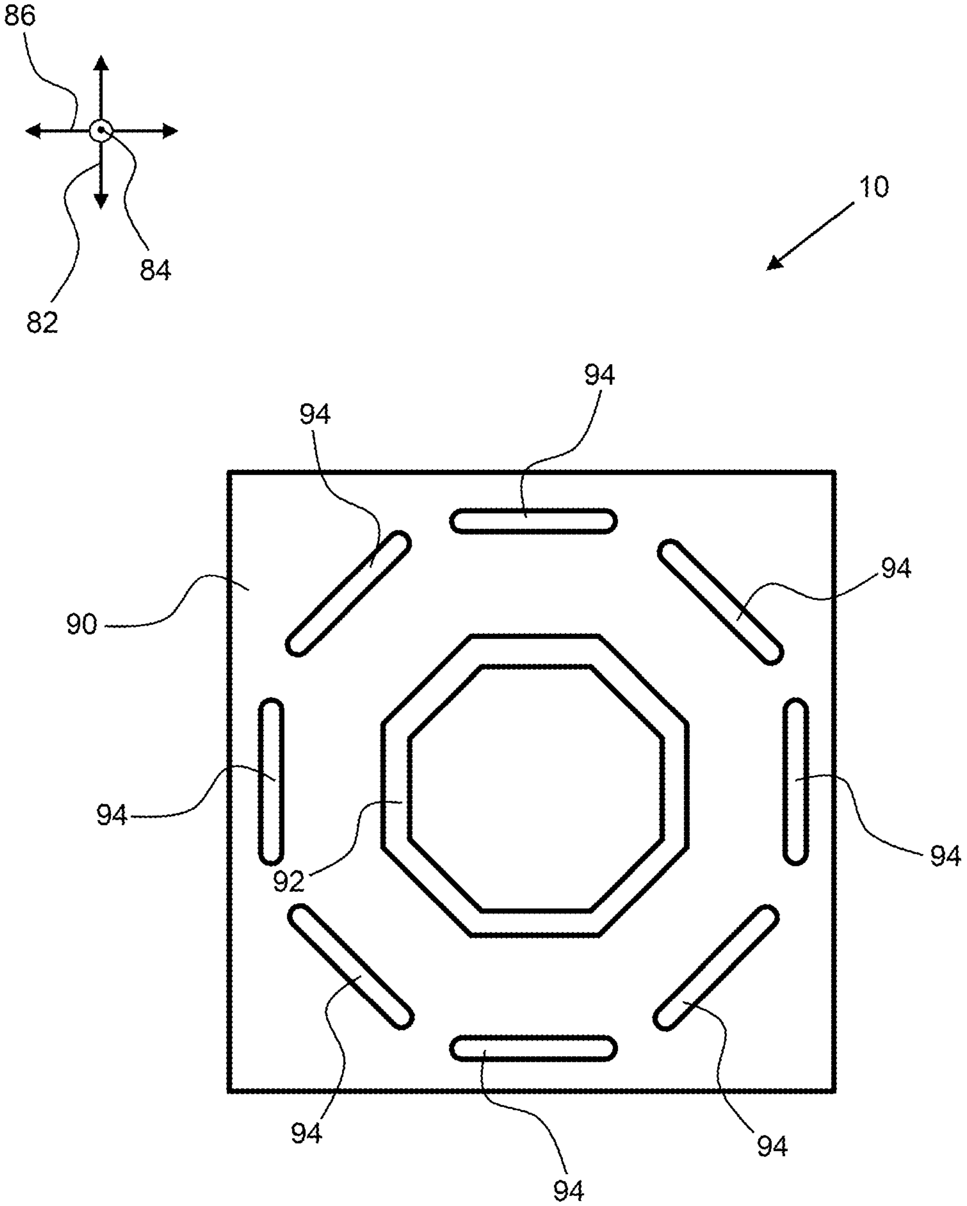
FIG. 14 shows a front view of an angle adjustment plate of a muscle memory training apparatus.
Figure 15:
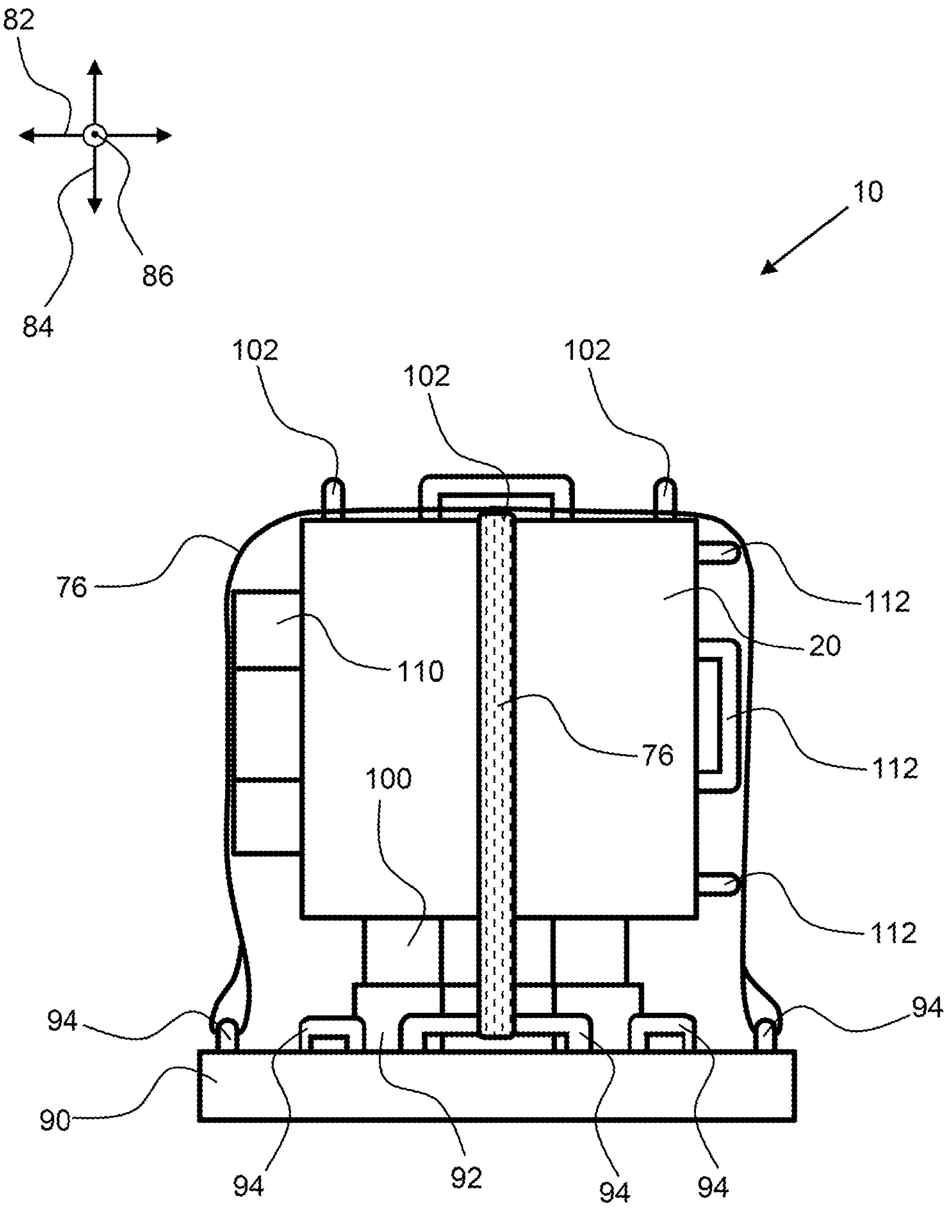
FIG. 15 shows a side view of a housing of a muscle memory training apparatus connected to an angle adjustment plate by a first angle adjustment protrusion, an interconnect portion, and straps.

As shown in FIG. 14, an angle adjustment plate 90 has an interconnect portion 92 that is configured to couple with the housing 20 of the perturbation portion 21 of the muscle memory training apparatus 10, shown in FIG. 15. The interconnect portion 92 shown in FIG. 14 has a plurality of sides, such as eight sides to enable adjustable angular orientation with the adjustable plate. The eight sides enable adjustment at 45, 90 135, 180, 225, 270 and 360 degrees. Angle adjustment plate retainers 94 are configured on the angle adjustment plate 90 around the interconnect portion 92 and may be slots configured to retain a strap. There are eight angle adjustment plate retainers 94, which corresponds with the eight sides of the interconnect portion 92.

As shown in FIG. 15, a first angle adjustment feature 100, such as a protrusion, extends from the housing 20 of perturbation portion 21 of the muscle memory training apparatus 10. A second angle adjustment feature 110 extends from the housing 20 from a separate face of the housing 20, and extends orthogonally from the extension direction of the first angle adjustment feature 100. The first angle adjustment feature 100 and the second angle adjustment feature 110 each have eight sides, which correlate with the eight sides of the interconnect portion 92. The second angle adjustment feature 110 extends orthogonal to the first angle adjustment feature 100. First angle adjustment retainers 102 extend from the housing 20 opposite the first angle adjustment feature 100. Second angle adjustment retainers 112 extend from the housing 20 opposite the second angle adjustment feature 110.

The first angle adjustment feature 100 is received by the interconnect portion 92 of the angle adjustment plate 90 to removably connect the housing 20 to the angle adjustment plate 90. The housing 20 is secured to the angle adjustment plate 90 by straps 76 that are configured through the first angle adjustment retainers 102 and the angle adjustment plate retainers 94. Two straps 76 are used to secure the housing 20 to the angle adjustment plate 90. These two straps 76 are configured orthogonal to one another.

The orientation of the housing 20 may be adjusted by removing the housing 20 or perturbation portion 21, from the angle adjustment plate 90, rotating the housing 20 about at least one of the sagittal axis 84, longitudinal axis 82 and frontal axis 86, and reconnecting the housing 20 to the angle adjustment plate 90 by receiving the first angle adjustment feature 100 with the interconnect portion 92 and securing the housing 20 to the angle adjustment plate 90 by configuring the straps 76 through the first angle adjustment retainers 102 and the angle adjustment plate retainers 94.

The orientation of the housing 20 may also be adjusted by removing the housing 20 from the angle adjustment plate 90 and rotating the housing 20 about the frontal axis 86 whereby the second angle adjustment feature 110, such as a protrusion, is aligned with the interconnect portion 92. The housing 20 may be reconnected to the angle adjustment plate 90 by receiving the second angle adjustment feature 110 with the interconnect portion and securing the housing 20 to the angle adjustment plate 90 by configuring the straps 76 through the second angle adjustment retainers 112 and the angle adjustment plate retainers 94.

Figure 16:
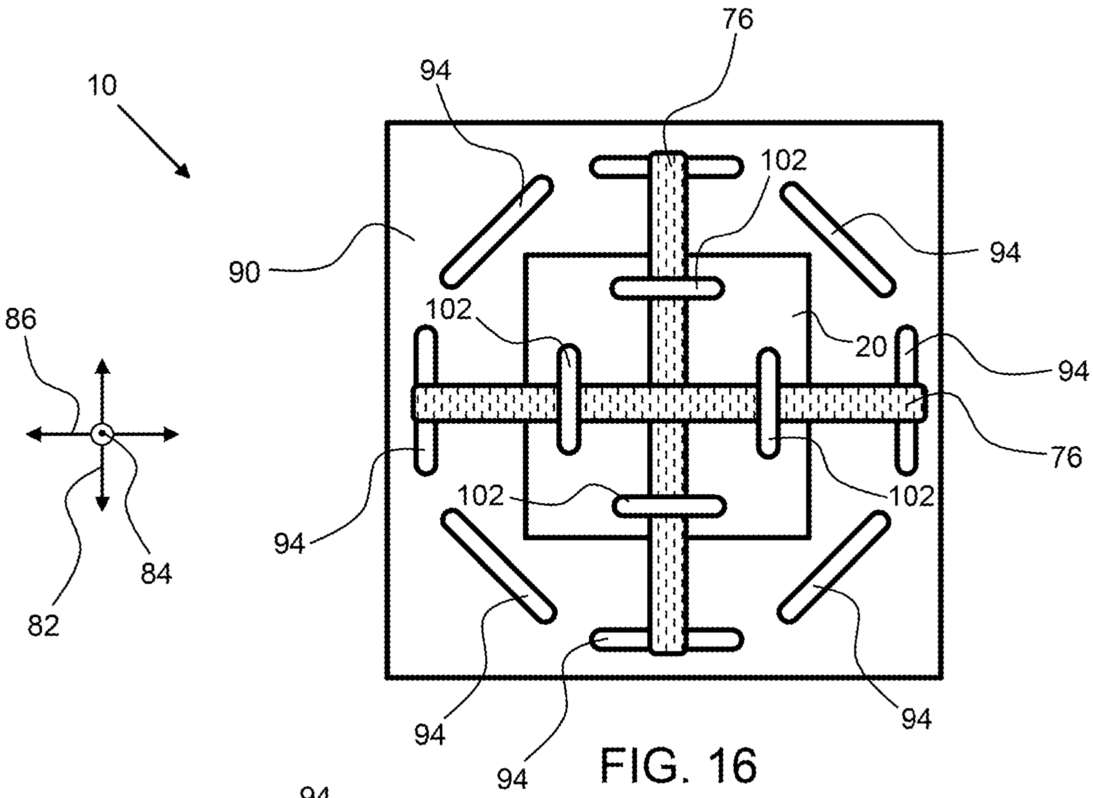
FIG. 16 shows a top view of a housing of a muscle memory training apparatus configured relative to an angle adjustment plate.
Figure 17:
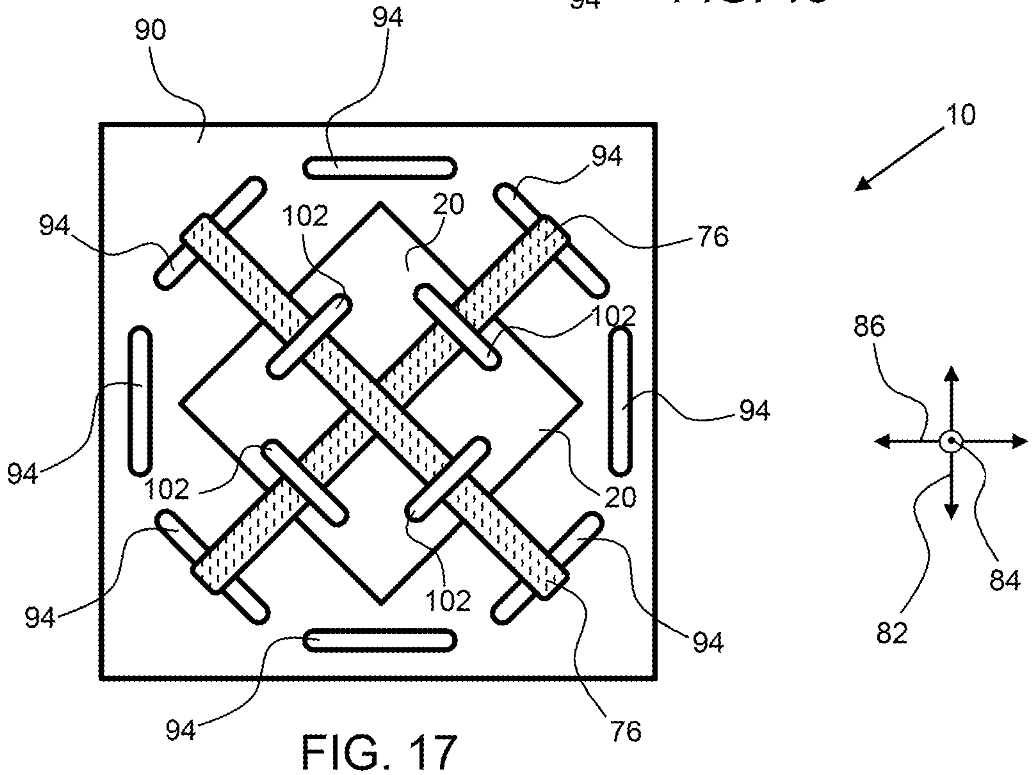
FIG. 17 shows the muscle memory training apparatus of FIG. 16 wherein the housing is oriented at a different angle relative to the angle adjustment plate.

As shown in FIG. 16, the housing 20 is configured relative to the angle adjustment plate 90. The housing 20 is secured to the angle adjustment plate 90 by straps 76 that are configured through the first angle adjustment retainers 102 and the angle adjustment plate retainers 94. As shown in FIG. 17, the housing 20 of FIG. 16 is configured at a different angle relative to the angle adjustment plate by rotating the housing 20 about the sagittal axis 84. As shown in FIG. 17, the housing 20 is secured to the angle adjustment plate 90 by straps 76 that are configured through the first angle adjustment retainers 102 and angle adjustment plate retainers 94. Since the orientation of the housing 20 is different in FIG. 17 than in FIG. 16, the straps 76 in FIG. 17 are configured through different angle adjustment plate retainers 94 than in FIG. 16 to allow for the housing 20 to be secured in its different orientation.

Figure 18:
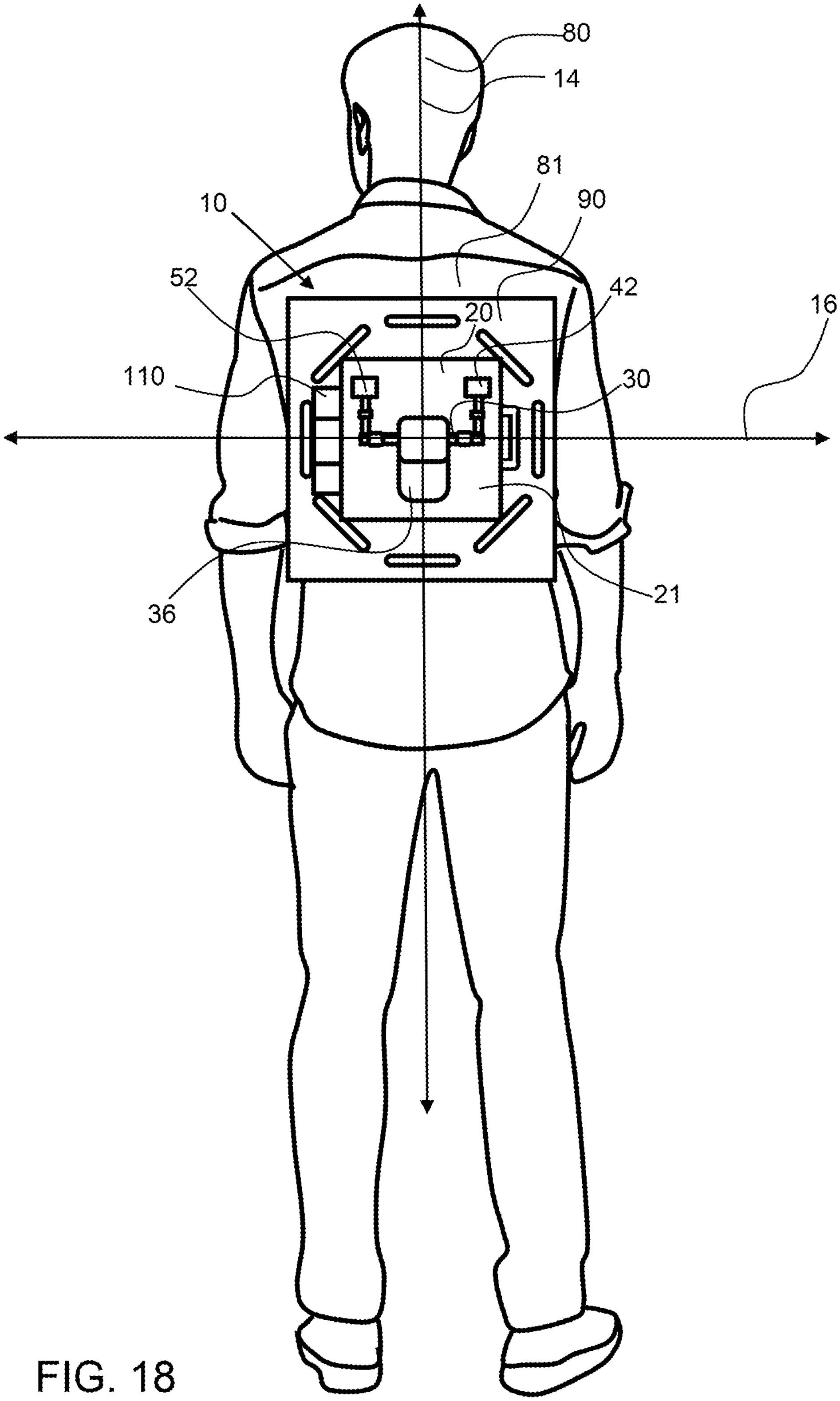
FIG. 18 shows a back view of a person with the muscle memory training apparatus configured on their back with the axle extending horizontally across the person's back and with the first arm and the second arm oriented in the same rotational direction from the axle.
Figure 19:
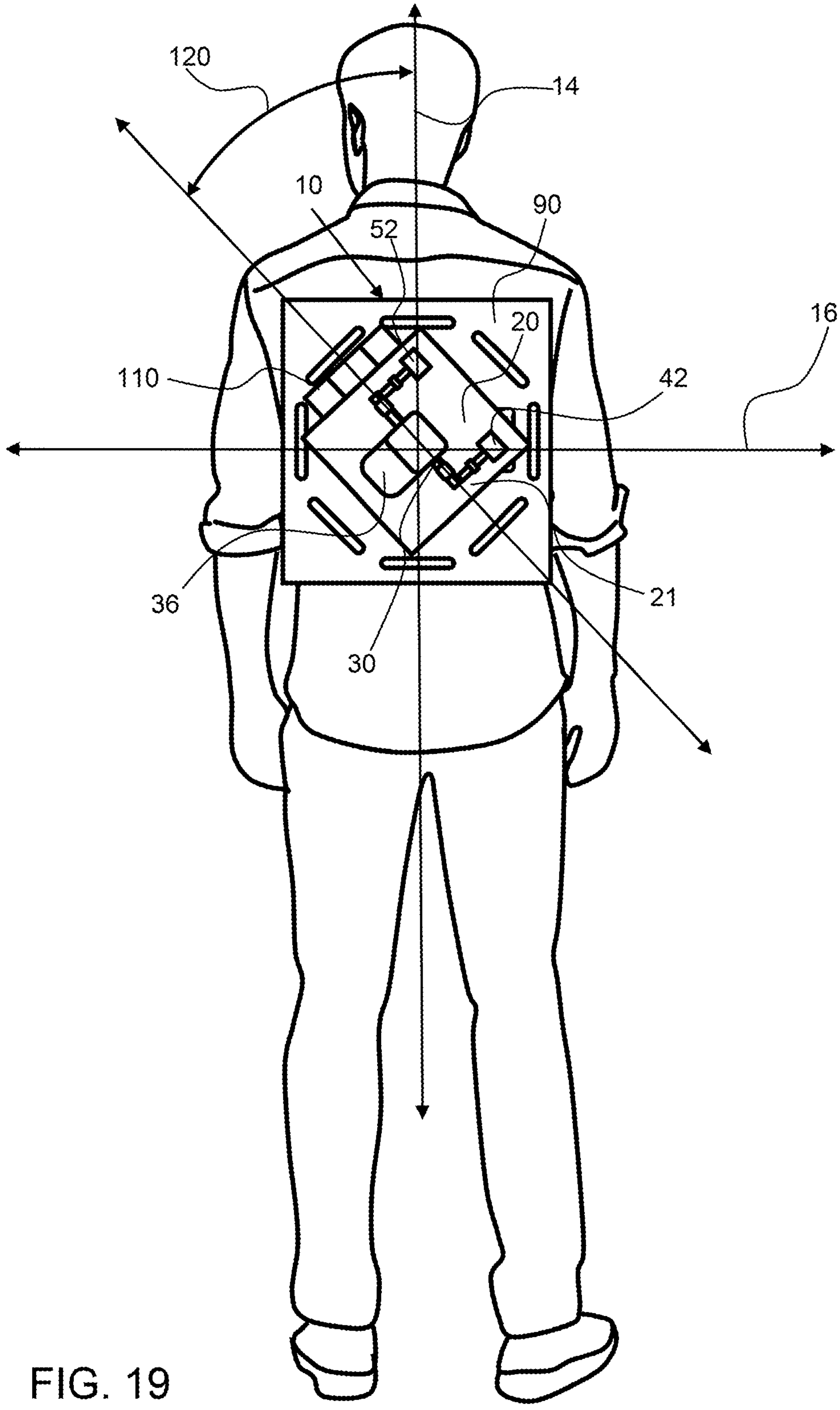
FIG. 19 shows a back view of a person with the muscle memory training apparatus configured on their back with the axle extending at an offset angle to vertical across the person's back; wherein the first angle adjustment protrusion has been rotated to configure the perturbation portion at said offset angle.
Figure 20:
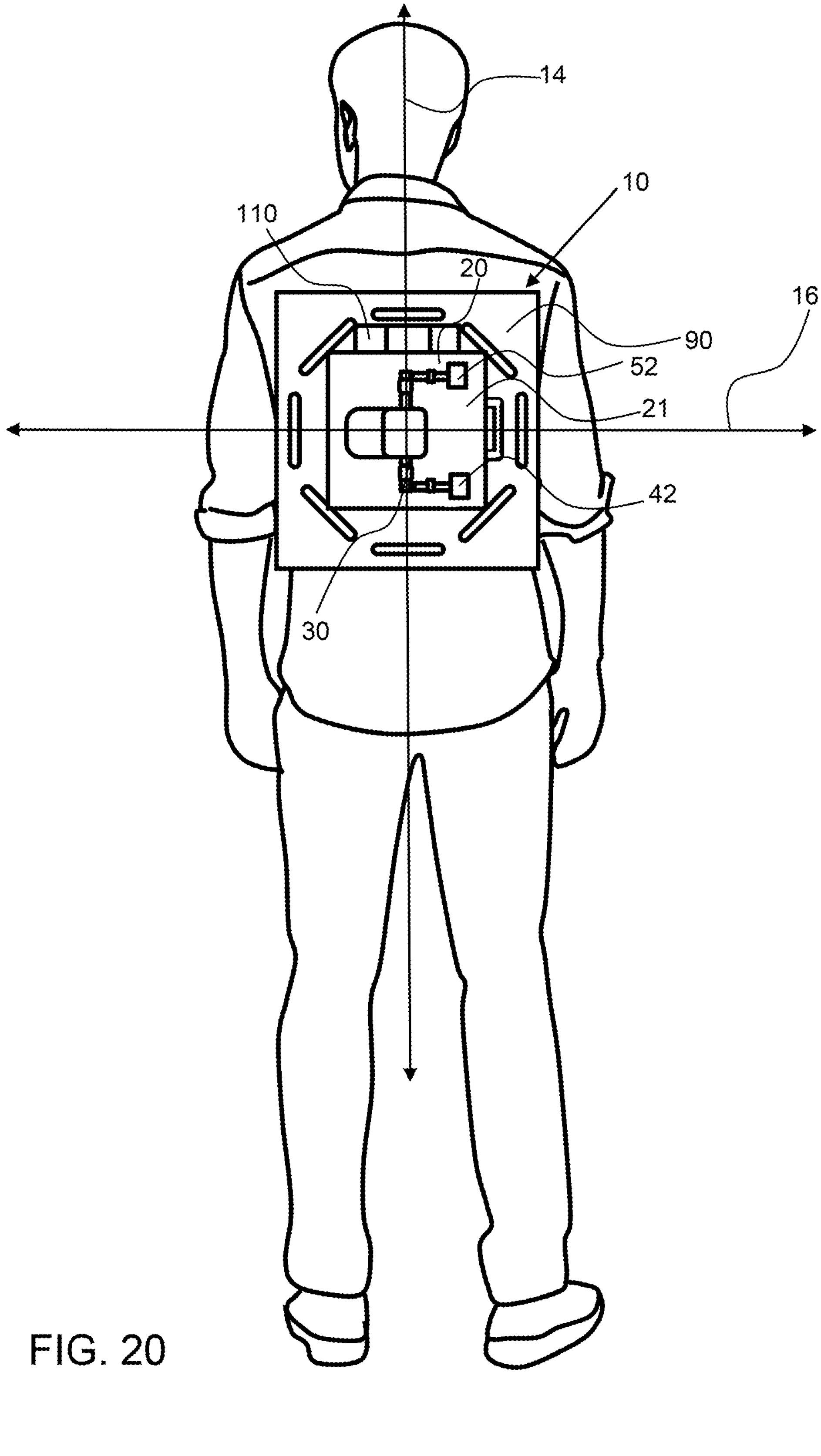
FIG. 20 shows a back view of a person with the muscle memory training apparatus configured on their back with the axle extending vertically along the person's back and with the first arm and the second arm oriented in the same rotational direction from the axle.
Figure 21:
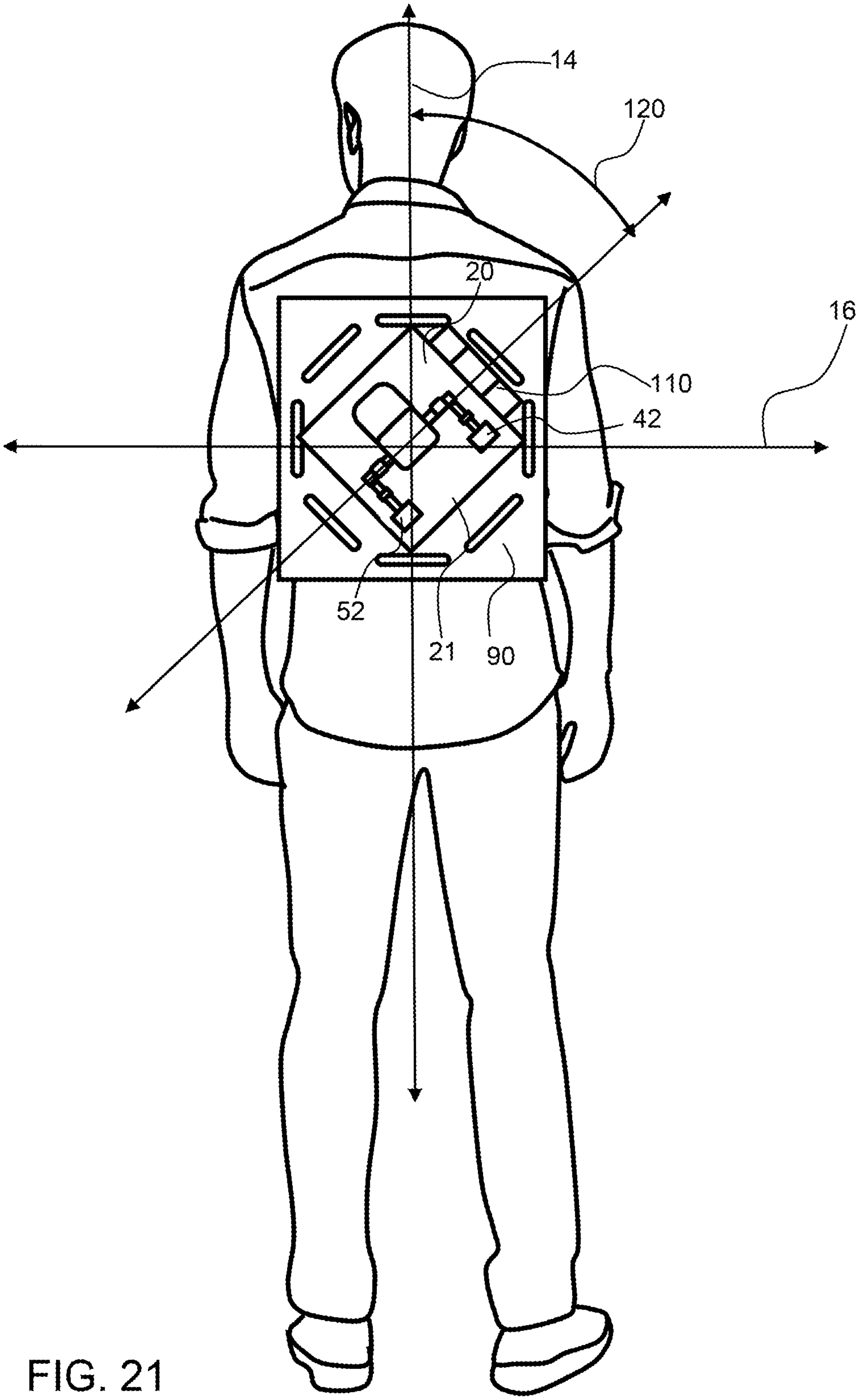
FIG. 21 shows a back view of a person with the muscle memory training apparatus configured on their back with the axle extending at an offset angle to vertical across the person's back; wherein the first angle adjustment protrusion has been rotated to configure the perturbation portion at said offset angle

Referring now to FIGS. 18 to 21, a person 80 has a muscle memory training apparatus 10 configured on their back with perturbation portion 21 configured in different rotational orientations with respect to the angle adjustment plate 90 via the first angel adjustment portion engaged with the angle adjustment plate 90. As shown in FIG. 18, the perturbation portion 21 is configured with the axle 30 extending horizontally across the person's back, or along a horizontal axis 16, and with the first arm 40 and the second arm 50 oriented in the same rotational direction from the axle. As shown in FIG. 19, the perturbation portion 21 is configured with the axle 30 extending at an offset angle 120 from the vertical axis 14 across the person's back 81, and with the first arm 40 and the second arm 50 oriented in the same rotational direction from the axle. The offset angle 120 is measured from the vertical axis 14. The perturbation portion 21 will produce a force that is offset from the vertical axis 14 and horizontal axis 16 in this configuration. The first angle adjustment protrusion (not shown) has been engaged with the angle adjustment plate 90. As shown in FIG. 20, the perturbation portion 21 is configured with the axle 30 extending vertically across the person's back, or along a vertical axis 14, and with the first arm 40 and the second arm 50 oriented in the same rotational direction from the axle. As shown in FIG. 21, the perturbation portion 21 is configured with the axle 30 extending at an offset angle 120 from the vertical axis 14 with the first arm 40 and the second arm 50 oriented in the same rotational direction from the axle. The offset angle 120 is measured from the vertical axis 14. The perturbation portion 21 will produce a force that is offset from the vertical axis 14 and horizontal axis 16 in this configuration. The first angle adjustment protrusion (not shown) has been engaged with the angle adjustment plate 90. Note that the offset angle has the same value but is to the opposing side of the vertical axis 14 from the perturbation portion 21 shown in FIG. 19.

Figure 22:
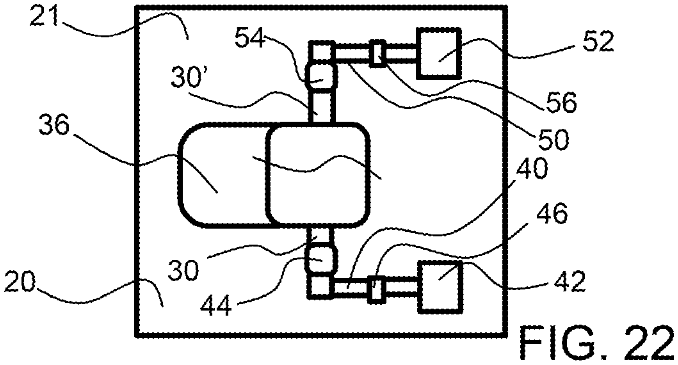
FIG. 22 shows a diagram of a perturbation portion of a muscle memory training apparatus having the first arm and second arm configured in the same rotational position with respect to the axle.

Referring now to FIGS. 22 to 25, a perturbation portion 21 of a muscle memory training apparatus 10 has a variety of adjustments in the arms and weights coupled to the axle 30. The first and second arms can be rotated about the axle and locked into a desired rotational position, such as having the arms extending in the same rotational position or opposing rotational positions, or about 180 degrees separated (within 15 degrees of 180 degrees). Also, the magnitude of the weight attached can be changed, as well as the has the first arm 40 and second arm 50 configured in the same rotational position with respect to the axle 30. As shown in FIG. 22, the first arm 40 and the second arm 50 are configured or extend in the same rotational orientation from the axle 30. Also, the first arm weight 42 and the second arm weight 52 may weight substantially the same within about 5%. For example, an exemplary perturbation portion 21 has a first arm weight 42 that weighs 0.5 kg and a second arm weight 52 that weighs 0.5 kg (+1-0.025 kg); thereby being substantially the same weight. Finally, the distance of the arm weight arm may be changed to produce a higher torque force as the weight is spun around the axle.

As shown in FIG. 22, a perturbation portion 21 of a muscle memory training apparatus 10 has the first arm 40 and second arm 50 configured in the substantially the same rotational position with respect to the axle 30, wherein the first arm extends from the axle in the same rotational orientation (within about 10 degrees) as the second arm. Also, the first arm weight 42 and second arm weight 52 are substantially the same weight and the first arm weight is configured substantially the same offset distance from the axle (within about 10%) as the second arm weight.

Figure 23:
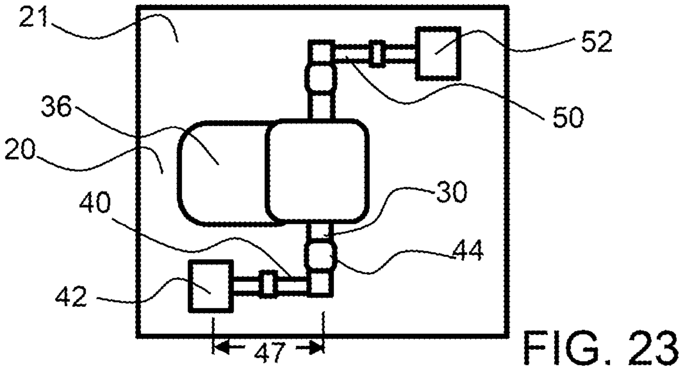
FIG. 23 shows a diagram of a perturbation portion of a muscle memory training apparatus having the first arm and second arm configured in opposing rotational position with respect to the axle, wherein the first arm extends from the axle 180 degrees from the second arm.

As shown in FIG. 23, a perturbation portion 21 of a muscle memory training apparatus 10 has the first arm 40 configured in a substantially opposing rotational position as the second arm 50 or about 180 degrees (within about 10 degrees of 180 degrees). Also, the first arm weight 42 and second arm weight 52 are substantially the same weight and the first arm weight is configured substantially the same offset distance from the axle (within about 10%) as the second arm weight.

Figure 24:
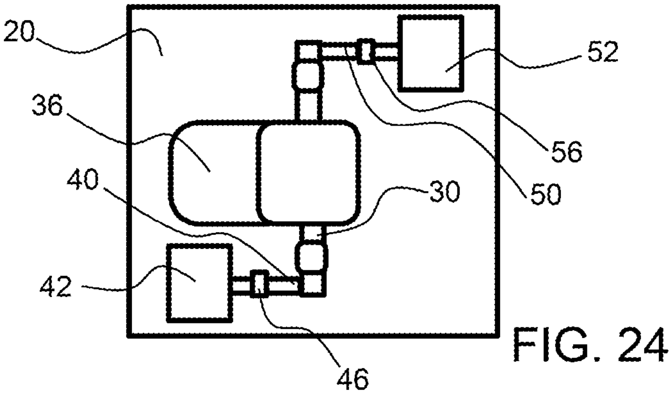
FIG. 24 shows a diagram of the perturbation portion of a muscle memory training apparatus shown in FIG. 23, with the first arm weight and second arm weight changed to heavier arm weights to increase the amount of force created by the perturbation portion.

As shown in FIG. 24, a perturbation portion 21 of a muscle memory training apparatus 10 has the first arm 40 configured in a substantially opposing rotational position as the second arm 50 as shown in FIG. 23. However, the first arm weight 42 and second arm weight 52 have been changed from those shown in FIG. 23 to heavier arm weights to increase the amount of force created by the perturbation portion. The heavier weights are represented as larger in FIG. 24 to those shown in FIG. 23, however the weight may be changed but the size of the arm weight may stay substantially the same.

Figure 25:
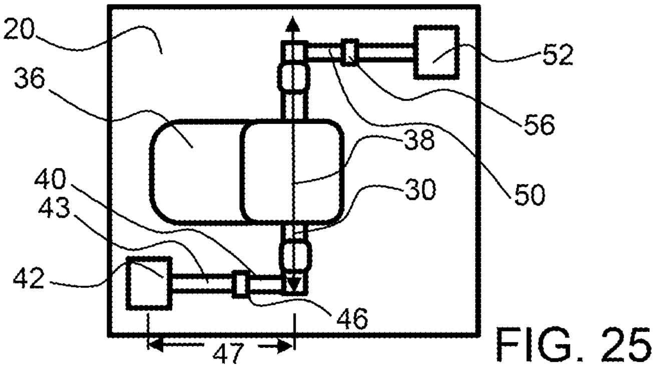
FIG. 25 shows a diagram of the perturbation portion of a muscle memory training apparatus shown in FIG. 23, with the first arm weight and second arm weight extended further from the axle to produce more force.

As shown in FIG. 25, a perturbation portion 21 of a muscle memory training apparatus 10 has the first arm 40 configured in a substantially opposing rotational position as the second arm 50 or about 180 degrees, as shown in FIG. 23. However, the first arm weight 42 and second arm weight 52 are configured a greater offset distance from the axle than the first arm weight and second arm weights shown in FIG. 23. The first arm weight arm 43 and second arm weight arm 53 may be changed or extended out further from the first arm weight coupler 46 and second arm weight coupler 56 to produce said greater offset distance. The torque offset distance 47, the distance from the rotational axis 38 of the axle 30 and the center of mass of the first arm weight 42 is shown in FIGS. 23 and 25, wherein this torque offset distance is greater in FIG. 25.

As reflex muscle memories become aberrant, voluntary muscle memories change as they attempt to adapt to an unstable platform.

The therapy is designed to restore stabilization muscle memories thereby alleviating the need for cognitive intervention and providing a stable platform upon which voluntary muscle memories may be restored. The present invention and method is configured to restore aberrant muscle memories and mitigate movement disorders.

Voluntary Muscle Memory

Muscle memory is generally described as a voluntary movement that is essentially automatic and requires little or no cognitive intervention. Practicing a movement, with intent to improve and knowledge of performance, increases accuracy, efficiency, and automaticity. Practice movements to restore aberrant muscle memories or improve them to superior levels.

Reflex Muscle Memory

Reflex muscle memory can be improved the same way. But how do you cause a reflex to be effectuated? Unlike voluntary muscle memories that respond to conscious decision, reflex muscle memories respond to stimulus of sensory neurons. Stimulate sensory neurons the way they are designed to be stimulated.

The programmable apparatus delivers repetitive, passive perturbations to stabilization reflex sensory neurons. It stretches muscles effectuating stretch reflexes, perturbs balance effectuating balance reflexes and does so under varying load conditions that effectuate Golgi tendon organ reflexes.

The therapy combines the passive movement with voluntary movement; exercise routines, that direct or target the passive perturbations and heighten demands on all movement muscle memories. Therapy is performing motor and cognitive tasks with intent to improve whilst stabilization reflexes are perturbed.

Therapy Description

The apparatus may be hand-held, attached to the user's body, or attached to an unmovable surface. It provides multi-directional, adjustable perturbations to joint and balance reflexes and when coupled with daily living activity or prescribed movements targeted for optimum results.

For example, the Romberg test is a series of postures designed to challenge and measure a person's balance acuity. It can also be used as an exercise, and another means of heightening and targeting demand.

A weight is rotated imparting a continuous sequence of perturbations to stabilization reflexes and thereby execution of reflex muscle memories.

Perturbation parameters, frequency, force, and rotational direction are adjustable. The frequency may be automatically or manually set by adjusting the motor control duty cycle. The force may be set by changing the radius of the orbital path and/or the weight being rotated. Rotational direction is switch selectable and causes perturbations to occur in a reversed order causing reflexes to occur in reverse order. Targeting reflexes is facilitated by orienting the perturbations to the user posture. For example, reorient the perturbation unit from the vertical to horizontal plane or walk to change the center of gravity, base of support, joint positions and load.

The frequency of the perturbation is synchronized with the user's natural reflex loop time. In this manner, the sum of the movements will remain consistent. When the frequency of the movements is the same, they will entrain and summate correctly.

For example, if the frequency is greater than the reflex loop time [time from stimulation to completion of muscle contraction]. A tetanic muscle contraction occurs. When repeated stimuli occur at short intervals the muscle doesn't have time to fully relax before it is called upon to contract again. Movement becomes erratic, ceases, or becomes rigid.

Figure 26:
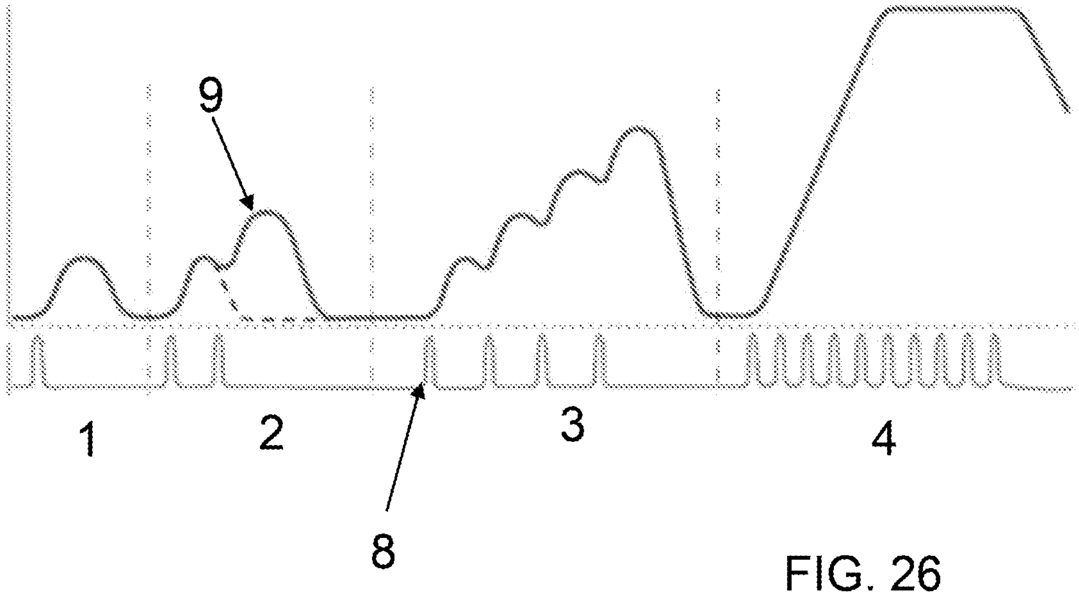
FIG. 26 shows a graph of perturbing forces as a function of time.

As shown in FIG. 26, in the first frame or time period (1), a single perturbation effectuates a single reflex. In the second frame, or time period (2), a second perturbation occurs before the first reflex is completed. In the third frame or time period (3), multiple perturbations occur before any reflex is completed. The effect is cumulative. In the fourth frame (4), full tetanus occurs and there is no muscle relaxation between perturbations. A line showing the perturbations 8 as a function of time is shown in the third frame. A line representing a reflex 9 is shown as a function of time above the perturbation line.

Figure 27:
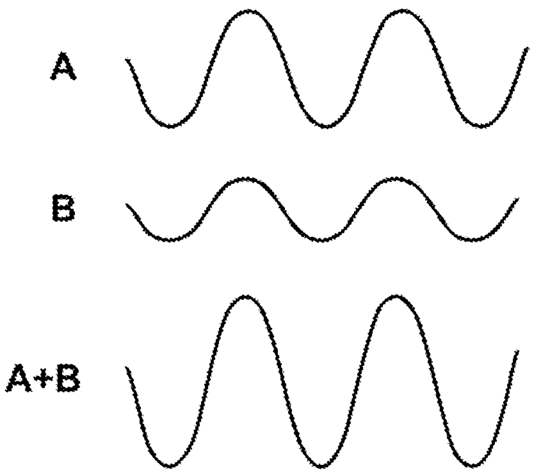
FIG. 27 shows a graph of perturbing forces as a function of time.

Starting a reflex movement before the prior movement is completed is like practicing a golf swing wherein successive swings are started before the current swing is completed. When perturbation and reflex movements of the same frequency are added together, the resultant movement will be the same frequency, maximum amplitude, and consistent. FIG. 27 shows the desired effect wherein the frequencies and phase are the same. The resultant movement A+B is the sum of both movements A and B.

Figure 28:
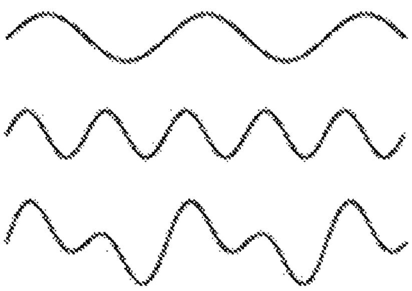
FIG. 28 shows a graph of perturbing forces as a function of time.

However, when the movement frequencies differ, the resultant movement will be a complex summation of forces that undergo constant change. FIG. 28 shows the summation of 2 frequencies, one of which is twice the other. The phase and amplitude relationships do not summate correctly for this application. Every combination of 2 forces occurring at different frequencies or phase relationships, yields a complex movement.

Perturbation frequency may be an important setting. The intent is to practice the reflex movement, not some derivative movement that can do more harm than good.

Fatigue

Reflexes occurring at a high frequency over a protracted period can lead to synaptic, muscle, and other forms of fatigue that cause short or long-term deficit performance. Reflexes begin to fail. Stability is inadequate and may even contribute to instability. Practice challenges fatigue and can improve strength and endurance. Not unlike building muscles, subject them to heightened demands and make them bigger, stronger, and less susceptible to fatigue.

In summary, the apparatus is designed to deliver programmed perturbations to stabilization reflexes whilst the user is engaged in daily living or planned activities.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A muscle memory training apparatus comprising:

a) a housing comprising a motor with an axle;
  wherein the motor is configured to rotate the axle about a rotational axis;

b) a first arm extending from the axle;

c) a first arm weight coupled to the first arm;

d) a strap configured to extend from the housing and around a person to couple the muscle memory training apparatus to said person;
  wherein the motor is configured to spin the first arm weight about the axle to produce an off-balancing force on said person;
  wherein the first arm weight has a torque offset distance from a rotational axis of the axle and wherein the torque offset distance is adjustable; and
  wherein the first arm weight is coupled to a first arm weight arm and wherein the first arm weight arm is configured to be interchanged with a longer first arm weight arm having a length greater by at least 20% than a length of the first arm weight arm.

2. The muscle memory training apparatus of claim 1, wherein the first arm is rotationally adjustable about the axle.

3. The muscle memory training apparatus of claim 1, wherein the first arm weight is configured to detachably attach to the first arm.

4. The muscle memory training apparatus of claim 3, wherein the first arm weight is configured for interchanging with a second-first arm weight having a weight that is at least 20% greater than the first weight of the first arm weight.

5. The muscle memory training apparatus of claim 1, further comprising a controller coupled with the motor and configured to change a rotational speed of the motor.

6. The muscle memory training apparatus of claim 1, wherein the housing has retainers configured to retain the strap to the housing.

7. The muscle memory training apparatus of claim 1, wherein the strap includes a shoulder strap configured to extend around the housing and over the shoulder of said person.

8. The muscle memory training apparatus of claim 7, wherein the strap includes a torso strap configured to extend around the housing and around the torso of said person.

9. The muscle memory training apparatus of claim 1, wherein the housing is a box having four sides, a front side, and a back side.

10. The muscle memory training apparatus of claim 1, further comprising a second arm extending from the axle and having a second arm weight coupled to said second arm.

11. The muscle memory training apparatus of claim 10, wherein the second arm extends from the axle on an opposing side of the motor from the first arm.

12. The muscle memory training apparatus of claim 10, wherein the second arm is rotationally adjustable about the axle.

13. The muscle memory training apparatus of claim 10, wherein the second arm weight is configured to detachably attach to the first arm.

14. The muscle memory training apparatus of claim 13, wherein the second arm weight is configured for interchanging with a second-second arm weight having a weight that is at least 20% greater than the first weight of the second arm weight.

15. The muscle memory training apparatus of claim 1, wherein the second arm weight has a torque offset distance from a rotational axis of the axle and wherein the torque offset distance is adjustable.

16. The muscle memory training apparatus of claim 15, wherein the second arm weight is coupled to a second arm weight arm and wherein the second arm weight arm is configured to be interchanged with a longer second arm weight arm having a length greater by at least 20% than a length of the second arm weight arm.

17. A method of training muscle memory comprising:

a) providing the muscle memory training apparatus of claim 1;

b) attaching the housing to a person by extending the strap around said person; and c) turning on the motor to spin the axle and the first weight coupled to the axle to produce an off-balancing force.

18. A muscle memory training apparatus comprising:

a) a housing comprising a motor with an axle;

wherein the motor is configured to rotate the axle about a rotational axis;

b) a first arm extending from the axle;

c) a first arm weight coupled to the first arm;

d) a strap configured to extend from the housing and around a person to couple the muscle memory training apparatus to said person;

wherein the motor is configured to spin the first arm weight about the axle to produce an off-balancing force on said person;

wherein the motor, first arm and first arm weight are configured in a perturbation portion of the housing and further comprising an angle adjustment plate configured to enable rotational engagement of the perturbation portion.

19. The muscle memory training apparatus of claim 18, wherein the angle adjustment plate has an interconnect portion, and wherein the perturbation portion has a first angle adjustment feature configured for rotational attachment with the interconnect portion of the angle adjustable plate.

20. The muscle memory training apparatus of claim 19, wherein the first angle adjustment feature is configured for at least four different rotational attachment orientations with the angle adjustable plate, wherein each rotational attachment orientation is at least 20 degrees offset for all other rotational attachment orientations.

21. The muscle memory training apparatus of claim 19, wherein the first angle adjustment feature is configured for at least six different rotational attachment orientations with the angle adjustable plate, wherein each rotational attachment orientation is at least 20 degrees offset for all other rotational attachment orientations.

22. The muscle memory training apparatus of claim 19, wherein the first angle adjustment feature is configured for at least eight different rotational attachment orientations with the angle adjustable plate, wherein each rotational attachment orientation is at least 20 degrees offset for all other rotational attachment orientations.

23. The muscle memory training apparatus of claim 22, wherein the interconnect portion is octagonal in shape.

24. The muscle memory training apparatus of claim 19, wherein the angle adjustment feature is a protrusion and the interconnect portion is an aperture or recess in the angle adjustment plate.

* * * * *